(12) United States Patent
Henry et al.

(10) Patent No.: US 8,131,984 B2
(45) Date of Patent: Mar. 6, 2012

(54) PIPELINED MICROPROCESSOR WITH FAST CONDITIONAL BRANCH INSTRUCTIONS BASED ON STATIC SERIALIZING INSTRUCTION STATE

(75) Inventors: G. Glenn Henry, Austin, TX (US); Terry Parks, Austin, TX (US); Brent Bean, Austin, TX (US)

(73) Assignee: VIA Technologies, Inc., New Taipei (TW)

( * ) Notice: Subject to any disclaimer, the term of this patent is extended or adjusted under 35 U.S.C. 154(b) by 492 days.

(21) Appl. No.: 12/481,499

(22) Filed: Jun. 9, 2009

(65) Prior Publication Data
US 2010/0205415 A1 Aug. 12, 2010

Related U.S. Application Data

(60) Provisional application No. 61/152,074, filed on Feb. 12, 2009.

(51) Int. Cl.
*G06F 9/32* (2006.01)
(52) U.S. Cl. .................................................. 712/234
(58) Field of Classification Search .................. 712/205, 712/234, 235, 236, 237, 238, 239, 240, 243
See application file for complete search history.

(56) References Cited

U.S. PATENT DOCUMENTS

| | | | |
|---|---|---|---|
| 4,338,661 | A | 7/1982 | Tredennick et al. |
| 4,546,431 | A | 10/1985 | Horvath |
| 5,511,215 | A | 4/1996 | Terasaka et al. |
| 5,805,876 | A | 9/1998 | Bose et al. |
| 6,496,975 | B1 | 12/2002 | Slinger |
| 6,598,153 | B1 | 7/2003 | Flachs et al. |
| 6,757,816 | B1 | 6/2004 | Yoaz et al. |

*Primary Examiner* — William M Treat
(74) *Attorney, Agent, or Firm* — E. Alan Davis; James W. Huffman

(57) ABSTRACT

A microprocessor includes a control register that stores a control value that affects operation of the microprocessor. An instruction set architecture includes a conditional branch instruction that specifies a branch condition based on the control value stored in the control register, and a serializing instruction that updates the control value in the control register. The microprocessor completes all modifications to flags, registers, and memory by instructions previous to the serializing instruction and to drain all buffered writes to memory before it fetches and executes the next instruction after the serializing instruction. Execution units update the control value in the control register in response to the serializing instruction. A fetch unit fetches, decodes, and unconditionally correctly resolves and retires the conditional branch instruction based on the control value stored in the control register rather than dispatching the conditional branch instruction to the execution units to be resolved.

33 Claims, 12 Drawing Sheets

PIPELINED MICROPROCESSOR WITH FAST CONDITIONAL BRANCH INSTRUCTIONS BASED ON STATIC SERIALIZING INSTRUCTION STATE

CROSS REFERENCE TO RELATED APPLICATIONS

This application claims priority to U.S. Provisional Application 61/152,074, filed Feb. 12, 2009, which is hereby incorporated by reference herein for all purposes.

This application is related to the following co-pending U.S. patent applications which are concurrently filed herewith, and which have a common assignee and common inventors, each of which is incorporated by reference herein for all purposes.

| Serial Number | Title |
| --- | --- |
| (CNTR.2282) | PIPELINED MICROPROCESSOR WITH FAST NON-SELECTIVE CORRECT CONDITIONAL BRANCH INSTRUCTION RESOLUTION |
| (CNTR.2326) | PIPELINED MICROPROCESSOR WITH NORMAL AND FAST CONDITIONAL BRANCH INSTRUCTIONS |
| (CNTR.2480) | PIPELINED MICROPROCESSOR WITH FAST CONDITIONAL BRANCH INSTRUCTIONS BASED ON STATIC EXCEPTION STATE |
| (CNTR.2481) | PIPELINED MICROPROCESSOR WITH FAST CONDITIONAL BRANCH INSTRUCTIONS BASED ON STATIC MICROCODE-IMPLEMENTED INSTRUCTION STATE |
| (CNTR.2483) | PIPELINED MICROPROCESSOR WITH FAST NON-SELECTIVE CORRECT CONDITIONAL BRANCH INSTRUCTION RESOLUTION |

FIELD OF THE INVENTION

The present invention relates in general to microprocessors, and more particularly to conditional branch instruction execution within a microprocessor.

BACKGROUND OF THE INVENTION

In the absence of control flow instructions, microprocessors fetch instructions sequentially and execute them. That is, the default action is for the microprocessor to fetch an instruction, and then to fetch the next sequential instruction, and then to fetch the next sequential instruction, and so forth. However, control flow instructions instruct the microprocessor to deviate from this sequential fetching regime. Microprocessors include in their instruction set architecture some form of conditional branch instruction that specifies a branch condition state (typically a condition flag or value in a general purpose register) and a branch condition (for example, bit set or bit clear or equal to zero or greater than a constant value). The conditional branch instruction also specifies a branch target address. The microprocessor examines the branch condition state in light of the branch condition to determine whether the branch condition state satisfies the branch condition specified by the conditional branch instruction. If the branch condition state satisfies the branch condition, the microprocessor begins fetching instructions at the branch target address rather than fetching the next sequential instruction.

As is well-known in the art of microprocessors, modern microprocessors include a pipeline of stages, each of which performs a different task with respect to program instructions. In a standard textbook model of a pipelined microprocessor, the stages include instruction fetch, instruction decode, operand fetch, execute, and result write-back stages. Conditional branch instructions within a program may significantly increase the amount of time required by the microprocessor to execute the program. This is because conventionally it is the execute stage that resolves the conditional branch instruction, i.e., that determines whether the branch condition state satisfies the branch condition. One reason for this is because there may be instructions in the program that are older in program order than the conditional branch instruction that update the branch condition state. Thus, the microprocessor must wait until the execution units produce the result of the older instructions, which are the source operands to the conditional branch instruction that constitute the branch condition state, before the operand fetch stage can fetch the source operands for the conditional branch instruction so that it can be issued for execution. However, the microprocessor may have fetched and processed in varying degrees many of the next sequential instructions after the conditional branch instruction and that are newer in program order than the conditional branch instruction by the time the execution units resolve the conditional branch instruction. This is particularly true in deeply pipelined and/or out-of-order execution microprocessors. If the execution units determine that the branch condition state satisfies the branch condition (i.e., the conditional branch instruction will be taken), the microprocessor must flush all the sequentially fetched instructions after the conditional branch instruction and commence fetching at the branch target address instead. This may significantly lengthen the time required by the microprocessor to execute the program.

To solve this problem, modern microprocessors include branch predictors that attempt to predict the direction (i.e., whether the branch condition state will satisfy the branch condition, referred to as "taken", or not satisfy it, referred to as "not taken"). However, the branch predictors may mispredict the direction, in which case the microprocessor incurs a branch misprediction penalty because it must flush the pipeline of the erroneously fetched instructions and commence fetching at the correct address (i.e., either the next sequential address or the branch target address, depending upon whether the correct direction). Again, this may significantly lengthen program execution time, as discussed above, particularly in the presence of some conditional branch instructions within programs that may be difficult to predict with much accuracy. Consequently, an approach has been taken to attempt to correctly resolve conditional branch instructions early enough in the pipeline to override the branch predictors. Such an approach is described in U.S. Pat. No. 5,805,876 issued to Bose et al., entitled "METHOD AND SYSTEM FOR REDUCING AVERAGE BRANCH RESOLUTION TIME AND EFFECTIVE MISPREDICTION PENALTY IN A PROCESSOR". However, a disadvantage of the microprocessor described in Bose et al. is that it selectively resolves the conditional branch instructions early. That is, it only resolves conditional branch instructions early if they satisfy a specific set of requirements, such as being in the first dispatchable position within an instruction buffer when first detected.

Therefore, what is needed is a microprocessor with an improved technique for allowing programs to conditionally branch.

BRIEF SUMMARY OF INVENTION

In one aspect, the present invention provides a pipelined microprocessor. The microprocessor includes a control register, configured to store a control value that affects operation of the microprocessor. The microprocessor also includes an instruction set architecture that includes a conditional branch instruction that specifies a branch condition based on the control value stored in the control register. The instruction set architecture further includes a serializing instruction that updates the control value in the control register. The microprocessor is configured to complete all modifications to flags, registers, and memory by instructions previous to the serializing instruction and to drain all buffered writes to memory before it fetches and executes the next instruction after the serializing instruction. The microprocessor also includes execution units, coupled to the control register, configured to update the control value in the control register in response to the serializing instruction. The microprocessor also includes a fetch unit, coupled to the control register, configured to fetch, decode, and unconditionally correctly resolve and retire the conditional branch instruction based on the control value stored in the control register rather than dispatching the conditional branch instruction to the execution units to be resolved.

In another aspect, the present invention provides a method for fast execution of a conditional branch instruction in a pipelined microprocessor having a control register that stores a control value that affects operation of the microprocessor, the microprocessor also having instruction set architecture that includes a serializing instruction that updates the control value in the control register, wherein the microprocessor is configured to complete all modifications to flags, registers, and memory by instructions previous to the serializing instruction and to drain all buffered writes to memory before it fetches and executes the next instruction after the serializing instruction. The method includes including in the instruction set architecture a conditional branch instruction that specifies a branch condition based on the control value stored in the control register. The method also includes updating the control value in the control register in response to the serializing instruction, wherein the updating the control value in the control register is performed by execution units of the microprocessor. The method also includes fetching, decoding, and unconditionally correctly resolving and retiring the conditional branch instruction based on the control value stored in the control register rather than dispatching the conditional branch instruction to the execution units to be resolved, wherein the fetching, decoding, and unconditionally correctly resolving and retiring are performed by a fetch unit of the microprocessor.

In another aspect, the present invention provides a computer program product for use with a computing device, the computer program product including a computer usable storage medium, having computer readable program code embodied in the medium, for specifying a pipelined microprocessor. The computer readable program code includes first program code for specifying a control register, configured to store a control value that affects operation of the microprocessor. The computer readable program code also includes second program code for specifying an instruction set architecture, that includes a conditional branch instruction that specifies a branch condition based on the control value stored in the control register, wherein the instruction set architecture further includes a serializing instruction that updates the control value in the control register, wherein the microprocessor is configured to complete all modifications to flags, registers, and memory by instructions previous to the serializing instruction and to drain all buffered writes to memory before it fetches and executes the next instruction after the serializing instruction. The computer readable program code includes third program code for specifying execution units, coupled to the control register, configured to update the control value in the control register in response to the serializing instruction. The computer readable program code includes fourth program code for specifying a fetch unit, coupled to the control register, configured to fetch, decode, and unconditionally correctly resolve and retire the conditional branch instruction based on the control value stored in the control register rather than dispatching the conditional branch instruction to the execution units to be resolved.

An advantage of the present invention is that because the fetch unit (which may be the microcode unit) resolves and retires fast conditional branch (FCB) instructions without dispatching them to the execution pipeline, the FCB instructions are potentially executed faster than conventional conditional branch instructions. Furthermore, the correct execution of FCB instructions by the fetch unit eliminates mispredictions and corrections that are associated with conventional conditional branch instructions in situations where a FCB instruction may be used by the programmer rather than a conventional conditional branch instruction. Another advantage is that fewer resources of the microprocessor are used to resolve and retire the FCB than a conventional conditional branch instruction. For example, because the FCB is not dispatched to the execution pipeline, the FCB does not occupy entries in the RAT, reservation stations, execution units, or reorder buffer.

DETAILED DESCRIPTION OF THE INVENTION

Figure 1:
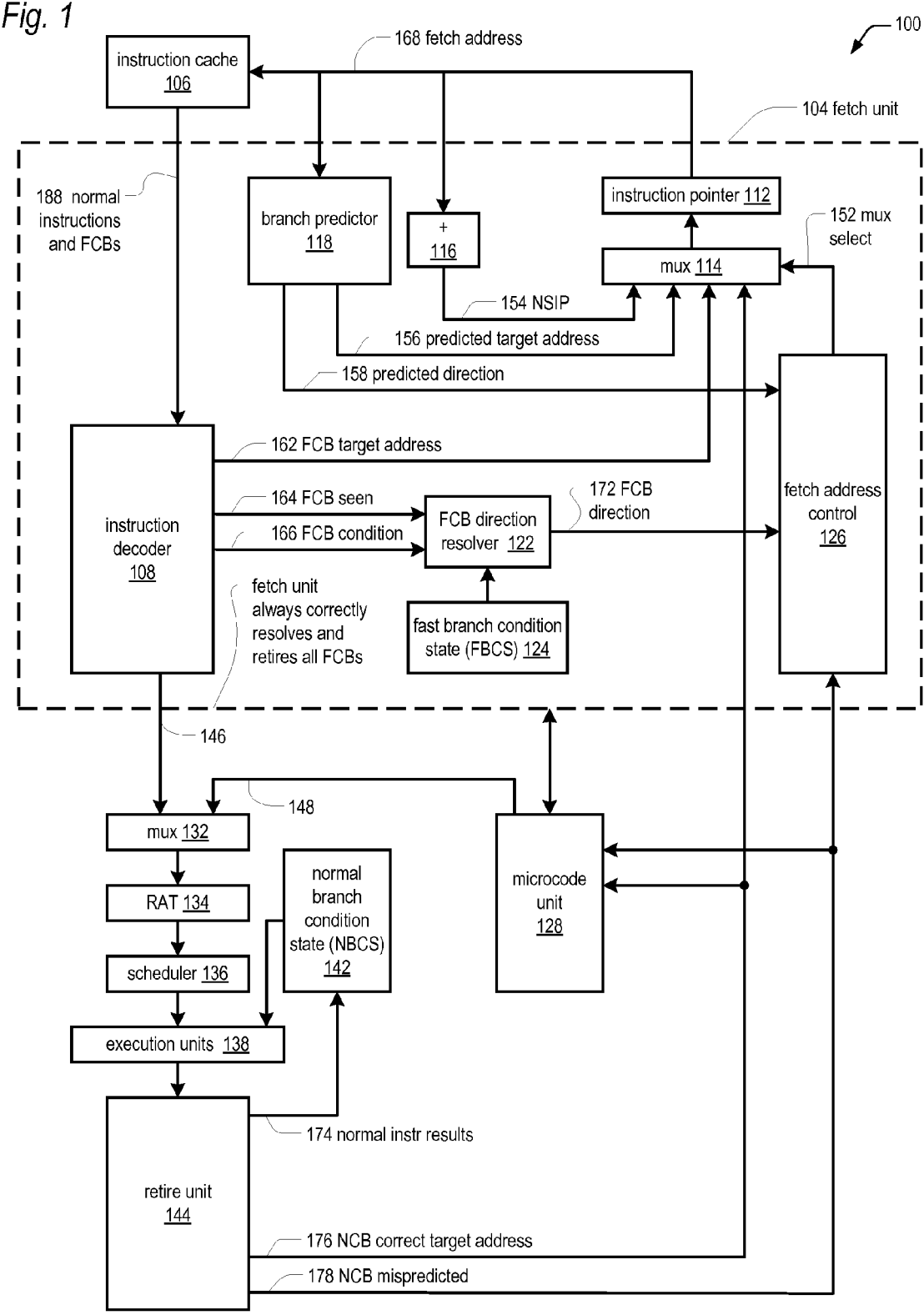
FIG. 1 is a block diagram of a microprocessor of the present invention.

A drawback of conventional approaches to the problems described above is that they rely on the microprocessor to determine the circumstances in which it may resolve a conditional branch instruction early in the pipeline, and if the circumstances do not exist, the microprocessor must resort to predicting the conditional branch instruction and then incurring the penalty associated with correcting (i.e., flushing, fetching from correct address, and executing) if the prediction was incorrect. The present inventors have observed that there are times when the programmer writing a program (or compiler/translator compiling/translating a higher-level language program into a machine language program) knows or can control the circumstances surrounding the update of a branch condition state that will be used by a conditional branch instruction in the program. In particular, there are particular branch condition state that the programmer may know are going to be static at particular times. The inventors have taken advantage of this observation to include within a microprocessor's instruction set a special type of conditional branch instruction, referred to herein as a fast conditional branch (FCB), that instructs the microprocessor to non-selectively correctly resolve the FCB within its fetch unit early in the pipeline using the static branch condition state, rather than sending the FCB to the execution units to be resolved and rather than making a prediction about the FCB. In response to detecting the FCB, the fetch unit non-selectively correctly resolves the FCB. That is, rather than predicting the FCB and then sending it to the execution units to be resolved, the fetch immediately correctly resolves the FCB using the static state. Thus, the program that includes the FCB rather than a conventional conditional branch instruction may potentially be executed faster. Furthermore, the immediate correct resolution of the FCB may be significantly advantageous because it avoids the possibility of a branch misprediction and the concomitant penalty associated therewith in a pipelined microprocessor. The misprediction avoidance advantage of the FCB may be even greater in the absence of branch prediction, such as in a low-cost and/or low-power microprocessor or microcontroller, or in the microsequencer of a microcode unit within a microprocessor, such as according to one embodiment of the present invention described herein.

Described herein are embodiments of a pipelined microprocessor that improves program execution time by having the FCB special type of conditional branch instruction that a programmer may include in his programs in addition to or in place of normal conditional branch (NCB) type instructions. In contrast to an NCB, the FCB enables the programmer to instruct the microprocessor to always correctly resolve and retire the FCB within the fetch unit of the microprocessor, rather than issuing the FCB to the execution units of the microprocessor to be resolved and retired, thereby saving clock cycles within the pipelined microprocessor. That is, the FCB enables the programmer to instruct the microprocessor to correctly resolve and retire the FCB based on the branch condition state upon which the FCB is conditioned without checking to see whether there are any instructions in program order older than the FCB that have not yet updated the FCB condition state. Always correctly resolving and retiring the FCB in the fetch unit is possible because the FCB condition state is special because the programmer knows at the time he writes the program that the FCB condition state does not depend upon the results of other unresolved instructions within the microprocessor. This is not true of the condition state of a NCB. It is noted that a microprocessor that always correctly resolves and retires the FCB in the fetch unit according to embodiments described herein is different from a conventional microprocessor that includes a branch predictor that makes a prediction of a conventional conditional branch instruction within the fetch unit. The two microprocessors are different because in the conventional microprocessor the prediction may be incorrect, which prevents the fetch unit from being able to retire the conventional conditional branch instruction because the execution units must correctly resolve the conventional conditional branch instruction. In contrast, in the embodiments described herein, the fetch unit always correctly resolves the FCB, which enables it to also retire the FCB.

Referring now to FIG. 1, a block diagram of a microprocessor 100 of the present invention is shown. In one embodiment, the microprocessor 100 stores user programs in an external memory, which is not shown. User programs include operating systems, application programs, system BIOS, or any other type of program written in or translated or compiled into the native instruction set of the microprocessor. The instruction cache 106 fetches user program instructions from the external memory. The instruction cache 106 provides temporary storage for the most frequently fetched instructions. In one embodiment, the instruction cache 106 is within microprocessor 100. In other embodiments, the instruction cache 106 is external to microprocessor 100.

A fetch unit 104 of the microprocessor 100 fetches instructions from the instruction cache 106. The fetch unit 104 includes an instruction decoder 108, which determines the type of instruction that was fetched. Instructions fetched from the instruction cache 106 include fast conditional branch instructions (FCB instructions) and normal instructions including normal conditional branch instructions (NCB instructions). Normal instructions are executed by execution units of the microprocessor 100. A microprocessor 100 correctly resolves a conditional branch instruction that is either an NCB or FCB instruction when it determines the correct direction and correct target address of the conditional branch instruction. This is distinct from a microprocessor 100 making a prediction about a conditional branch instruction, since the microprocessor 100 may eventually determine that the prediction was incorrect and have to correct itself.

FCB instructions are correctly resolved and retired within the fetch unit 104 of the microprocessor 100. Execution units 138 of microprocessor 100 execute normal instructions, including NCB instructions. A retire unit 144 of microprocessor 100 retires normal instructions, including NCB instructions. Conditional branch instructions specify a branch condition and a branch target address. The processor examines a stored branch condition state to determine whether it satisfies a condition specified by the conditional branch instruction, i.e., to determine the direction of the conditional branch instruction. If the branch condition state satisfies the branch condition, then the branch direction is "taken;" otherwise the direction is "not taken." If the branch is taken, then the branch target address specifies the address of the next instruction to execute. If the branch is not taken, then the next instruction to execute is the next sequential instruction after the NCB or FCB instruction. The processing of FCBs and NCBs is described in more detail in the following paragraphs.

In one embodiment, the instruction decoder 108 includes an instruction translator that translates macroinstructions of a macroinstruction set of the microprocessor 100 (such as the x86 instruction set architecture) into microinstructions of a microinstruction set architecture of the microprocessor 100. The instruction translator may translate macroinstructions into an FCB, NCB, or other instruction described herein.

The instruction decoder 108 determines if a fetched instruction is an FCB or NCB. If the decoded instruction is an NCB or other normal instruction, the instruction decoder 108 transfers the normal instruction 146 to mux 132. If the decoded instruction is an FCB, the instruction decoder 108 generates a true value on an FCB seen indication 164 to an FCB direction resolver 122 in the fetch unit 104. Additionally, the instruction decoder 108 transfers an FCB condition 166 specified by the FCB instruction to the FCB direction resolver 122. Examples of the FCB condition 166 are bit on, bit off, equal to, less than, greater than, and in which the bit or field of a fast conditional branch state (FBCS) 124 to be evaluated is also specified in the FCB condition 166, as one skilled in the art will appreciate. The instruction decoder 108 also transfers an FCB target address 162 specified by the FCB instruction to a mux 114 in the fetch unit 104.

The FCB direction resolver 122 resolves the direction of FCB instructions in the fetch unit 104. The FCB direction resolver 122 generates a FCB direction 172 to a fetch address control 126, in response to the FCB seen indication 164, the FCB condition 166, and the FBCS 124. If the FBCS 124 satisfies the FCB condition 166, then the FCB direction 172 is true; otherwise, the FCB direction 172 is false. The fetch unit 104 always correctly resolves and retires FCB instructions. The fetch unit 104 does not dispatch FCB instructions to the execution units 138 and retire unit 144 because the fetch unit 104 itself executes and retires all FCB instructions.

By using an FCB rather than an NCB, the programmer is asserting that the FBCS 124—or at least the portion of the FBCS 124 specified as the branch condition state by the FCB—is static within the relevant timeframe, in the sense that the programmer guarantees that there are no unretired instructions older than the FCB that would change the FBCS 124 value. The FBCS 124 may be one of many different branch condition states within the microprocessor 100 that is static for various reasons. In one embodiment, the programmer may assert that the FBCS 124 is static because it is exception state 586 such as described below with respect to FIGS. 5 and 6. In one embodiment, the programmer may assert that the FBCS 124 is static because it is microcode-implemented instruction (MII) state 786 such as described below with respect to FIGS. 7 and 8. In one embodiment, the programmer may assert that the FBCS 124 is static because it is state written by a serializing instruction of the microprocessor 100 instruction set architecture such as described below with respect to FIGS. 9 and 10.

In one embodiment, the programmer may assert that the FBCS 124 is static because it is state that is only accessed (i.e., written or read) by the microcode routines of the microcode ROM 306, and the microcode routines guarantee the state to be static when the fetch unit reads the state to resolve a FCB instruction in a microcode routine. The microcode routines guarantee the state is static as follows. Each microcode routine that includes an instruction that writes the state also includes a subsequent instruction that causes the pipeline to flush all newer instructions in the microprocessor 100 pipeline before returning control to the user program that includes the instruction that is being implemented by the microcode routine or that generated the exception handled by the microcode routine. In one embodiment, the state is written by the microcode routines when the microprocessor 100 boots up from a reset condition. The state specifies values that are globally used by multiple microcode routines rather than values that are used locally by individual microcode routines. In one embodiment, the state physically resides in the reorder buffer (ROB) within the retire unit 144.

In one embodiment, the FBCS 124 may be general purpose registers of the microprocessor 100, or individual bits thereof; however, in order to achieve correct program operation, the programmer must guarantee that the specified FBCS 124 is static with respect to instructions older in program order than the FCB, since the microprocessor 100 executes the FCB within the fetch unit 104 and does not insure that the FCB will receive the result of any other unretired instruction that updates the FBCS 124.

The fetch unit 104 also includes a branch predictor 118. The branch predictor 118 generates a predicted target address 156 to the fetch unit mux 114 and a predicted direction 158 to the fetch address control 126 in response to the instruction pointer 112 of the fetch unit 104 generating a fetch address 168 to the instruction cache 106. In particular, the branch predictor 118 indicates to the fetch address control 126 that the predicted target address 156 and predicted direction 158 are valid if the fetch address 168 specifies a cache line that previously included a conditional branch instruction.

The fetch address control 126 of the fetch unit 104 generates a mux select 152 to the fetch unit mux 114 to select the fetch address 168 that is used to fetch the next instruction from the instruction cache 106. In response to a true NCB mispredicted indication 178, the fetch address control 126 generates the mux select 152 to select the NCB correct target address 176. Otherwise, in response to a FCB direction 172 indicating a FCB is taken, the fetch address control 126 generates the mux select 152 to select the FCB target address 162. Otherwise, in response to a predicted direction 158 indicating a NCB is taken, the fetch address control 126 generates the mux select 152 to select the predicted target address 156. Otherwise, the fetch address control 126 generates the mux select 152 to select the next sequential IP address (NSIP) 154. The NSIP is simply the next sequential address in the instruction cache 106 following the fetch address 168. An address increment circuit 116 generates the NSIP 154 each time the instruction pointer 112 generates a fetch address 168.

In one embodiment, the branch predictor 118 includes a branch target cache (not shown). When the fetch address 168 hits in the branch target cache, the branch predictor 118 generates the predicted target address 156 and predicted direction 158 to the fetch address control 126. The microprocessor 100 updates the branch target cache with the addresses and resolved target addresses of previously executed conditional branch instructions. Furthermore, the microprocessor 100 updates the branch target cache with direction prediction information based on the resolved direction of the previously executed conditional branch instructions. In one embodiment, the microprocessor 100 does not update the branch target cache based on executed FCB instructions since the fetch unit 104 correctly resolves and retires FCB instructions. By always correctly resolving the FCB in the fetch unit 104, the microprocessor advantageously avoids incurring a branch misprediction penalty related to the processing of FCBs; whereas, the microprocessor may incur a branch misprediction penalty related to the processing of NCBs as discussed below.

The instruction pointer register 112 receives and stores the address selected by mux 114 of the fetch unit 104. The instruction pointer register 112 provides the fetch address 168 to the instruction cache 106 to fetch a cache line from the instruction cache 106.

The mux 132 outside the fetch unit receives instructions from two sources and selects between them. The first source is normal instructions 146 fetched from the instruction cache 106 and provided by the fetch unit 104. The second source is normal instructions 148 provided by a microcode unit 128 of the microprocessor 100. The microcode unit 128 includes microcode routines that, for example, implement complex instructions and handle certain exception conditions. Embodiments are contemplated in which the microcode unit 128 is not present in the microprocessor 100.

The microprocessor 100 includes a RAT 134 that determines operand dependencies of normal instructions 146 and 148. The RAT 134 transfers normal instructions 146 and 148 to an instruction scheduler 136 of the microprocessor 100 after determining the operand dependencies. In one embodiment, the microprocessor 100 also includes a reorder buffer (ROB) (not shown, which is included within the retire unit 144 in one embodiment) that saves state information about each unretired instruction in the microprocessor 100. The ROB insures that normal instructions are retired in program order even though they may be executed out of program order. The RAT 134 allocates an entry in the ROB 118 for each instruction before dispatching the instruction to a reservation station (discussed below). The instruction scheduler 136 schedules normal instructions 146 and 148 for issuance to the execution units 138 for execution thereby. In one embodiment, the microprocessor 100 includes reservation stations (not shown) that are instruction queues that store instructions waiting for their operands so they can be issued to the execution units 138 by the instruction scheduler 136, which are well known in the art of out-of-order execution microprocessors. In one embodiment, the microprocessor 100 performs out-of-order instruction execution, and the instruction scheduler 136 uses the dependency information generated by the RAT 134 to schedule proper instruction execution.

NCB instructions specify a branch condition based on a normal branch condition state (NBCS) 142. The NBCS 142 may be updated with the result of a normal instruction that is fetched prior to the NCB instruction. Therefore, the instruction scheduler 136 waits to issue the NCB instruction to the execution units 138 until the older instruction that updates the NBCS 142 has generated its result and made the result available to the execution units 138. The NBCS 142 may include architecturally visible registers of the microprocessor 100, such as general purpose registers and/or condition code registers, such as the x86 EFLAGS register, for example.

The execution units 138 of the microprocessor 100 execute all normal instructions 146 and 148, including NCB instructions. The execution units 138 execute the NCB instructions using the NBCS 142. If the NBCS 142 satisfies the branch condition specified in the NCB instruction, then the branch is taken and the branch target address specified by the NCB instruction is used to fetch instructions. If the NBCS 142 does not satisfy the branch condition specified in the NCB instruction, then the branch is not taken and the fetch unit 104 or microcode unit 128 fetches instructions from the next sequential address after the address of the NCB instruction in the instruction cache 106 or microcode ROM 306 (of FIG. 3) of the microcode unit 128, respectively.

The execution units 138 transfer results of all executed normal instructions, including NCB instructions, to the retire unit 144. The retire unit 144 keeps track of instructions issued to the execution units 138 and their execution state, writes back results of executed instructions, and retires instructions in program order. Specifically, the retire unit 144 writes the result 174 of an instruction that updates the NBCS 142. The retire unit 144 retires the NCB instruction after the instruction that updates the NBCS 142 has written the result 174 to the NBCS 142. The retire unit 144 generates an indication 178 to the fetch address control 126 in the fetch unit 104 to indicate whether the branch predictor 118 mispredicted the NCB instruction.

If an NCB instruction is mispredicted, the microprocessor 100 flushes from the pipeline all instructions newer in program order than the NCB instruction; the retire unit 144 retires the NCB instruction; the fetch address control 126 generates the mux select 152 to select the NCB correct target address 176 provided by the retire unit 144, which was previously resolved by the execution units 138, which gets selected by the mux 114 for loading into the instruction pointer 112; and the fetch unit 104 fetches the next instruction from the instruction cache 106 at the instruction pointer fetch address 168. Thus, the microprocessor may incur a branch misprediction penalty related to the processing of NCB instructions, but not with respect to FCB instructions.

In one embodiment, the number of pipeline stages between the fetch unit 104 and the retire unit 144 is on the order of ten. Thus, the fetch unit 104 may be able to correctly execute and retire the FCB a significant number of clock cycles earlier than an NCB would be executed by the execution units 138 and retired by the retire unit 144. Furthermore, in those cases where the branch predictor 118 would have mispredicted an NCB, an even greater number of clock cycles may be saved by an FCB used by the programmer in the program rather than the mispredicted NCB.

Figure 2A:
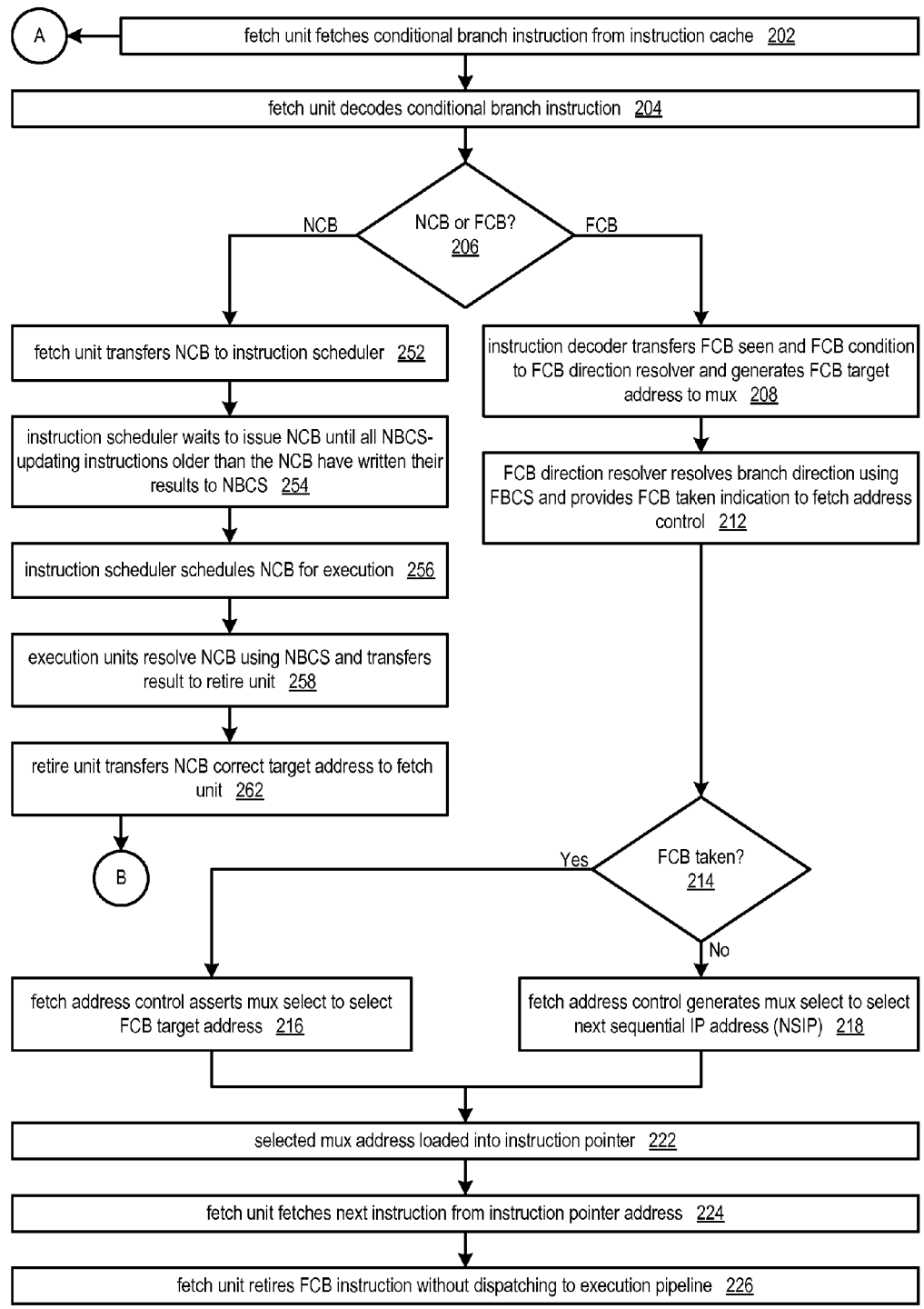
FIGS. 2a and 2b are a flowchart illustrating operation of the microprocessor of FIG. 1 of the present invention to execute conditional branch instructions.
Figure 2B:
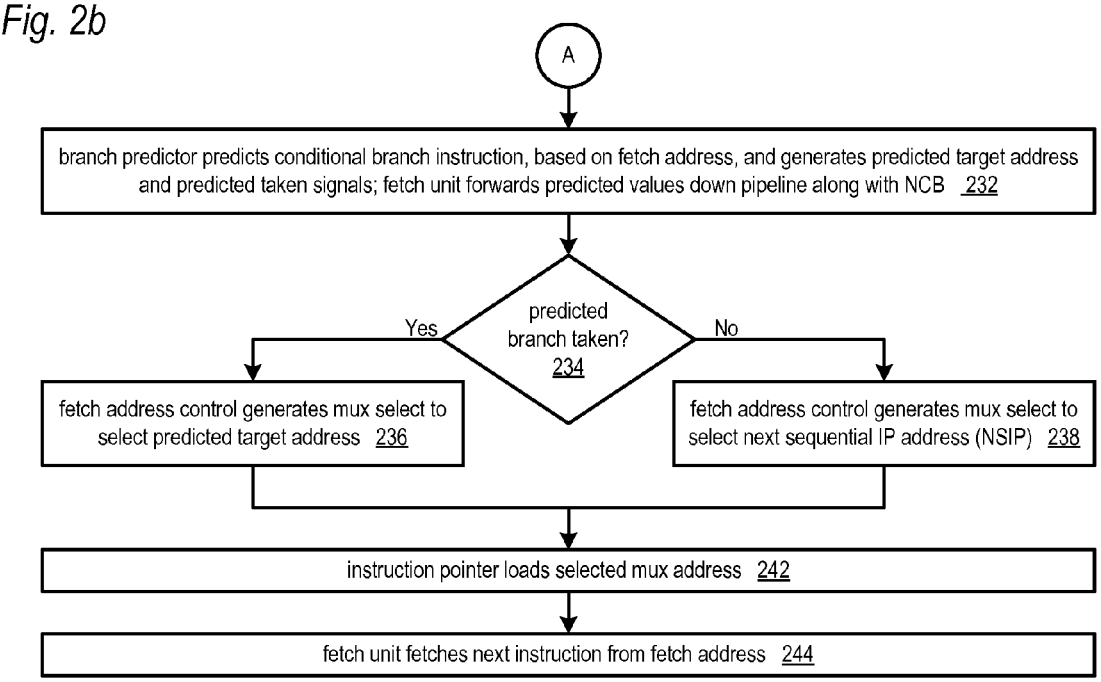
Figure 2B:
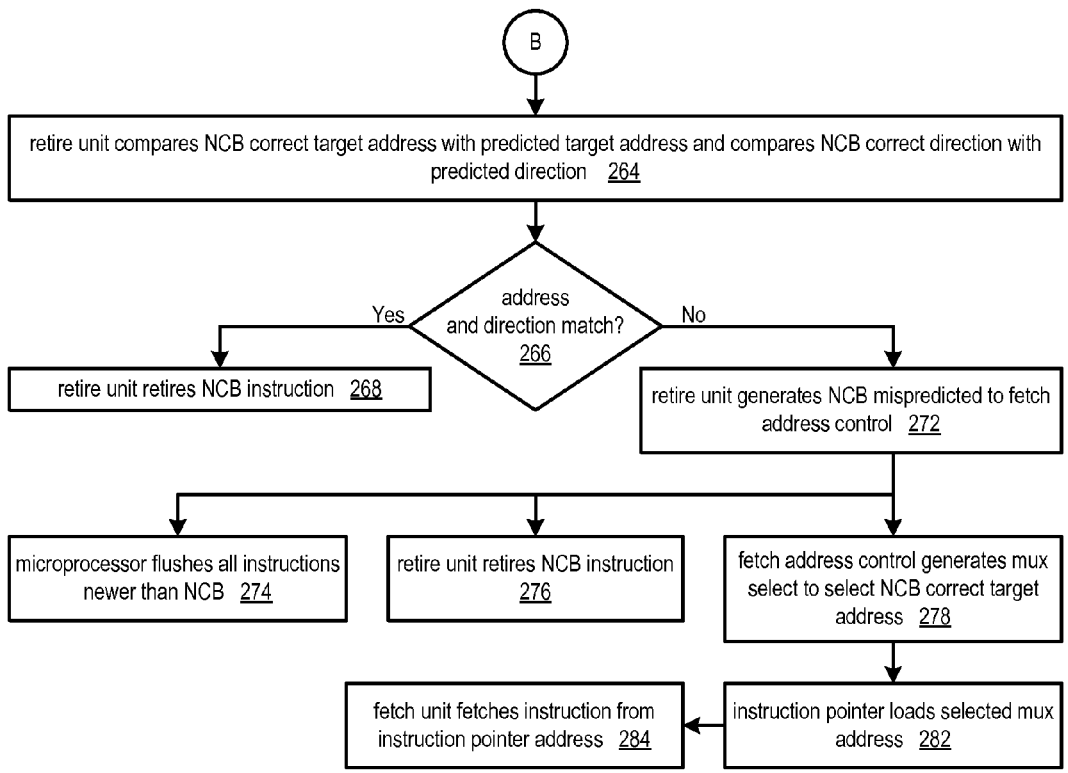

Referring now to FIG. 2, a flowchart illustrating operation of the microprocessor 100 of FIG. 1 of the present invention to execute conditional branch instructions is shown. Flow begins at block 202.

At block 202, the fetch unit 104 fetches a conditional branch instruction from the instruction cache 106. The conditional branch is either a normal conditional branch (NCB) instruction, or a fast conditional branch (FCB) instruction. Execution units 138 execute NCB instructions and the retire unit 144 retires NCB instructions. The fetch unit 104 of microprocessor 100 executes and retires FCB instructions. Flow proceeds concurrently to blocks 204 and 232.

At block 204, the instruction decoder 108 in the fetch unit 104 decodes the conditional branch instruction. Flow proceeds to decision block 206.

At decision block 206, the instruction decoder 108 determines whether the conditional branch instruction fetched from the instruction cache 106 is an NCB or FCB instruction. If the fetched conditional branch instruction is an NCB instruction, then flow proceeds to block 252. If the fetched conditional branch is a FCB instruction, then flow proceeds to block 208.

At block 208, the instruction decoder 108 transfers the FCB seen 164 and the FCB condition 166 signal to the FCB direction resolver 122 and generates the FCB target address 162 to the mux 114 of FIG. 1. The FCB condition 166 signal indicates to the FCB direction resolver 122 the branch condition that was specified in the FCB instruction. The FCB target address 162 is the branch target address specified in the FCB instruction and is the fetch address 168 that instructions in the instruction cache 106 are fetched from if the FCB condition 166 is satisfied. Flow proceeds to block 212.

At block 212, the FCB direction resolver 122 resolves the FCB direction 172 using the fast branch conditional state (FBCS) 124 of FIG. 1 and provides the FCB direction 172 to the fetch address control 126 in the fetch unit 104. The FCB direction 172 is resolved as taken if the FBCS 124 satisfies the FCB condition 166; otherwise, the FCB direction 172 is resolved as not taken. Flow proceeds to decision block 214.

At decision block 214, the FCB direction resolver 122 determines whether the FCB branch condition 166 has been satisfied. If the FCB branch condition 166 has been satisfied, then flow proceeds to block 216. If the FCB branch condition 166 has not been satisfied, then flow proceeds to block 218.

At block 216, the fetch address control 126 asserts the mux select 152 to the mux 114 to select the FCB target address 162. This reflects the case where the FCB direction 172 was resolved as taken, and the fetch unit 104 fetches the next instruction from a fetch address 168 that is the FCB target address 162 specified in the FCB instruction. Flow proceeds to block 222.

At block 218, the fetch address control 126 asserts the mux select 152 to the mux 114 to select the next sequential IP address (NSIP) 154. This reflects the case where the FCB direction 172 was resolved as not taken, and the fetch unit 104 fetches the next instruction from a fetch address 168 that is the next sequential address 154 following the FCB instruction. Flow proceeds to block 222.

At block 222, the mux address selected in either block 216 or 218 is loaded into the instruction pointer 112. Flow proceeds to block 224.

At block 224, the fetch unit 104 fetches the next instruction from the fetch address 168 provided by the instruction pointer register 112. If the FCB instruction was taken, the fetch address 168 is the FCB target address 162 specified in the FCB instruction. If the FCB branch was not taken, the fetch address 168 is the next sequential address following the FCB instruction address in the instruction cache 106. Flow proceeds to block 226.

At block 226, the fetch unit 104 retires the FCB instruction, without dispatching the FCB to the execution pipeline. It is noted that the retire unit 144 retires normal instructions, and the fetch unit 104 retires FCB instructions fetched from the instruction cache 106. Flow ends at block 226.

At block 232, the branch predictor 118 predicts the branch direction of a conditional branch instruction, based on the fetch address 168. The branch predictor 118 generates a predicted target address 156 and a predicted direction 158 for NCB instructions. The fetch unit 104 forwards the predicted target address 156 and predicted direction 158 down the execution pipeline, along with the fetched NCB instruction 146. In contrast, FCB instructions are fetched, executed, and retired completely and correctly within the fetch unit 104. Flow proceeds to decision block 234.

At decision block 234, the fetch address control 126 examines the predicted direction 158 output by the branch predictor 118. If the predicted direction 158 is taken, flow proceeds to block 236. If the predicted direction 158 is not taken, flow proceeds to block 238.

At block 236, the fetch address control 126 in the fetch unit 104 generates the mux select 152 to select the predicted target address 156. Flow proceeds to block 242.

At block 238, the fetch address control 126 in the fetch unit 104 generates the mux select 152 to select the next sequential IP address (NSIP) 154. Flow proceeds to block 242.

At block 242, the instruction pointer 112 in the fetch unit 104 loads the address that was selected at block 236 or 238. Flow proceeds to block 244.

At block 244, the fetch unit 104 fetches the next instruction in the instruction cache 106 from the instruction pointer fetch address 168. Flow ends at block 244.

At block 252, the fetch unit 104 transfers the NCB instruction 146 to the instruction scheduler 136. The instruction decoder 108 in the fetch unit 104 outputs the NCB instruction 146 to the mux 132, which selects fetch unit 104 instructions 146 to the RAT 134. Previously, the RAT 134 determines operand dependencies for the NCB instruction 146, and dispatches the NCB instruction 146 to the instruction scheduler 136. Flow proceeds to block 254.

At block 254, the instruction scheduler 136 waits to issue the NCB instruction 146 to the execution units 138 until all instructions that update the NBCS 142 and are older than the NCB instruction 146 have written their result to the NBCS 142. This ensures that the NBCS 142 is stable and correct prior to resolving the NCB instruction 146 branch direction in the execution units 138. Flow proceeds to block 256.

At block 256, the instruction scheduler 136 schedules execution units 138 to execute the NCB instruction 146. Flow proceeds to block 258.

At block 258, the execution units 138 resolve the NCB instruction 146, using the NBCS 142, and transfers the result to the retire unit 144. If the NBCS 142 satisfies the branch condition specified in the NCB instruction 146, the branch is resolved as taken; otherwise, the branch is resolved as not taken. Additionally, the execution units 138 calculate the NCB correct target address 176. Flow proceeds to block 262.

At block 262, the retire unit 144 transfers the NCB correct target address 176 that was determined in block 258 to the fetch unit 104. If the NCB instruction 146 branch was taken, the NCB correct target address 176 is the branch target address specified by the NCB instruction 146. If the NCB instruction 146 branch was not taken, the NCB correct target address 176 is the next sequential memory address following the address of the NCB instruction 146. Flow proceeds to block 264.

At block 264, the retire unit 144 compares the NCB correct target address 176 with the predicted target address 162 and compares the NCB correct direction with the predicted direction 158 forwarded from the fetch unit 104. These comparisons are to determine if the predicted target address 156 and predicted direction 158 were correct. Earlier in block 232, the fetch unit 104 forwarded the predicted target address 156 and predicted direction 158 down the execution pipeline, along with the fetched NCB instruction 146. Flow proceeds to decision block 266.

At decision block 266, the retire unit 144 determines if the NCB correct target address 176 matches the predicted target address 156 and if the NCB correct direction matches the predicted direction 158. If so, then the branch predictor 118 correctly predicted the address and branch direction, and flow proceeds to block 268; otherwise, flow proceeds to block 272.

At block 268, the retire unit 144 retires the NCB instruction 146. The retire unit 144 is not required to perform additional steps since the branch predictor 118 correctly predicted the branch and the correct instructions were fetched from the instruction cache 106 at the predicted target address 156. Flow ends at block 268.

At block 272, the retire unit generates a true value on the NCB mispredicted indication 178 of FIG. 1 to the fetch address control 126 in the fetch unit 104 in response to determining that the NCB correct target address 176 does not match the predicted target address 156 and/or the NCB correct direction does not match the predicted direction 158. Flow proceeds to blocks 274, 276, and 278.

At block 274, the microprocessor 100 flushes all instructions from the execution pipeline that are newer in program order than the NCB instruction 146. The execution pipeline is flushed since the instructions in the pipeline are invalid due to being fetched from an incorrect fetch address 168. Flow ends at block 274.

At block 276, the retire unit 144 retires the NCB instruction 146. Flow ends at block 276.

At block 278, the fetch address control 126 in the fetch unit 104 generates the mux select 152 to select the NCB correct target address 176. Flow proceeds to block 282.

At block 282, the instruction pointer 112 loads the address selected by mux 114 at block 278, i.e., the NCB correct target address 176. Flow proceeds to block 284.

At block 284, the fetch unit 104 fetches the next instruction from the instruction cache 106 at the fetch address 168 stored in the instruction pointer 112, i.e., the NCB correct target address 176. Flow ends at block 284.

Figure 3:
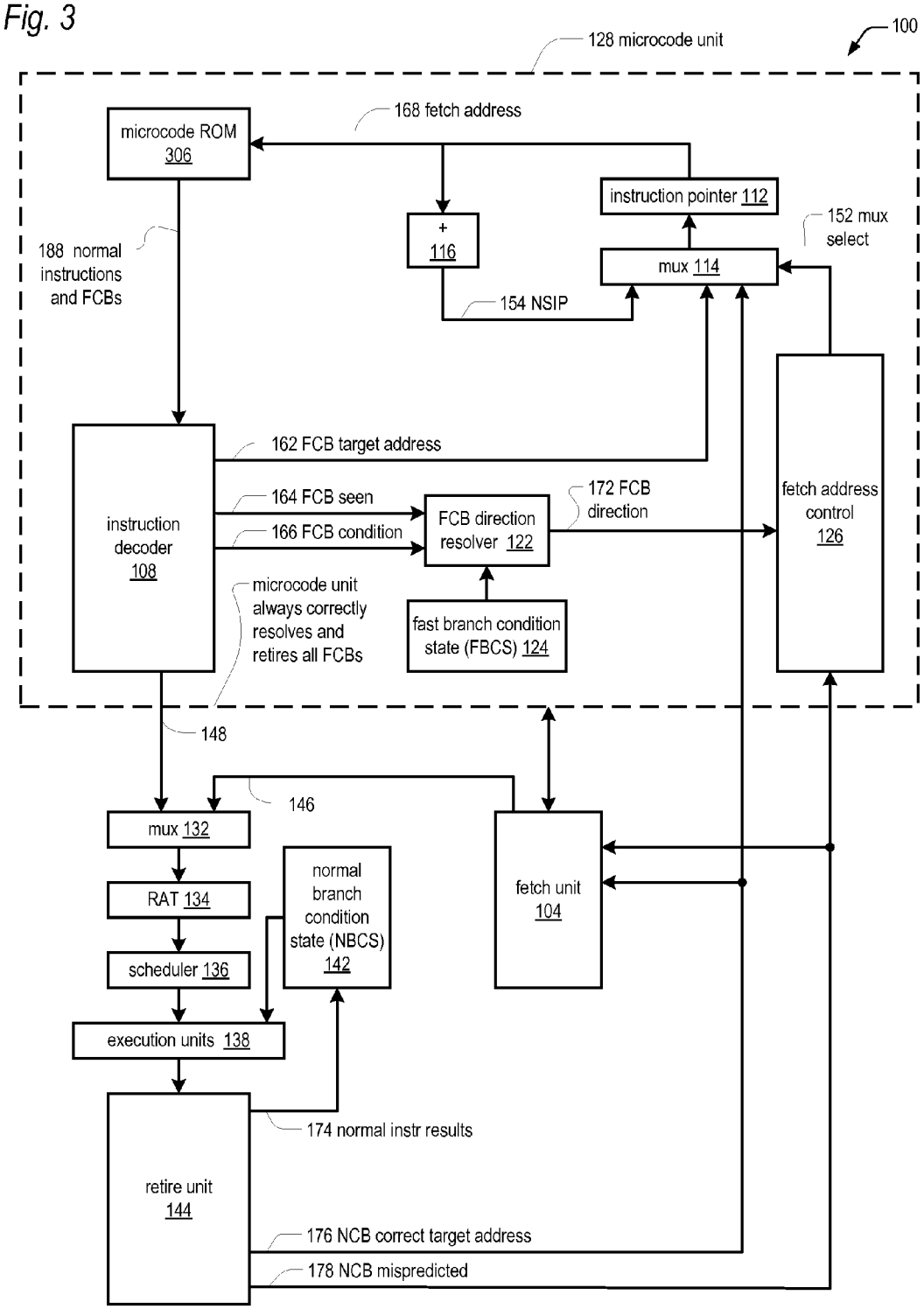
FIG. 3 is a block diagram illustrating a microprocessor according to an alternate embodiment of the present invention.

Referring now to FIG. 3, a block diagram illustrating a microprocessor 100 according to an alternate embodiment of the present invention is shown. FIG. 3 is similar to FIG. 1 in many respects. However, details of the details of the fetch unit 104 are not shown in FIG. 3 and the details of the microcode unit 128 are shown. The microcode unit 128 of FIG. 3 includes many elements similar to the fetch unit 104 of FIG. 1 and like-numbered elements perform similar functions.

One difference is that the microcode unit 128 fetches instructions 188 from a microcode ROM 306, rather than from the instruction cache 106 of FIG. 1. The microcode ROM 306 stores microcode routine instructions that perform actions needed by the microprocessor 100 in order to process the instructions of user programs. Thus, in this sense, the microcode routines stored in the ROM 306 are non-user programs because they are not part of the user programs themselves. In other words, the designers of the microprocessor 100 develop the microcode routines stored in the ROM 306 rather than normal users of the microprocessor 100 that write user programs that are stored in system memory and/or a non-volatile storage medium of the computer system, such as a disk drive.

An example of actions performed by the microcode routines is exception handling. The microcode ROM 306 includes exception handlers that are used to handle exceptions generated by user program instructions, such as invalid opcode exceptions, divide by zero exceptions, interrupts, and page faults, which are given as illustrative examples, as well as micro-exceptions taken by the microprocessor 100 that are specific to the microarchitecture of the microprocessor 100 rather than exceptions defined by the macroarchitecture of the microprocessor 100. For another example, the microcode routines include code that implements complex and infrequently executed instructions of the microprocessor 100 instruction set, such as trigonometric function instructions, read/write model specific registers instructions, and serializing instructions (such as those described in more detail below with respect to FIGS. 9 and 10) that may update control values that put the microprocessor 100 in a new mode or state, such as changing the paging mode or put the microprocessor 100 in protected mode or updating descriptor tables or invalidating cache lines, which are given as illustrative examples. Thus, the microcode unit 128 is a second fetch unit of the microprocessor 100 that fetches microcode routine instructions from the microcode ROM 306, decodes them, and in the case of an FCB instruction, also always correctly resolves and retires FCB instructions.

Another difference is that the microcode unit 128 does not include the branch predictor 118 of FIG. 1. Consequently, in normal flow (i.e., in the absence of an FCB, correction for mispredicted NCB, exception, trap to microcode to implement a user instruction, etc., as discussed herein), the microcode unit 128 always "predicts" that a conditional branch instruction will not be taken, i.e., the microcode unit 128 fetches the instruction at the NSIP 154 rather than at a predicted target address such as provided by the branch predictor 118 of FIG. 1. However, embodiments are contemplated in which the microcode unit 128 includes a branch predictor, albeit perhaps smaller, less complex, and less power-consuming, that performs a function similar to the branch predictor 118 of FIG. 1.

Nevertheless, like the fetch unit 104 of FIG. 1, the microcode unit 128 of FIG. 3 is configured to fetch and unconditionally correctly resolve and retire FCBs, as will be described now with respect to FIG. 4. It is noted that an embodiment is contemplated in which both the fetch unit 104 and the microcode unit 128 are configured to fetch and unconditionally correctly resolve and retire FCBs; whereas, embodiments are also contemplated in which only one of the fetch unit 104 and the microcode unit 128 are configured to fetch and unconditionally correctly resolve and retire FCBs.

Figure 4A:
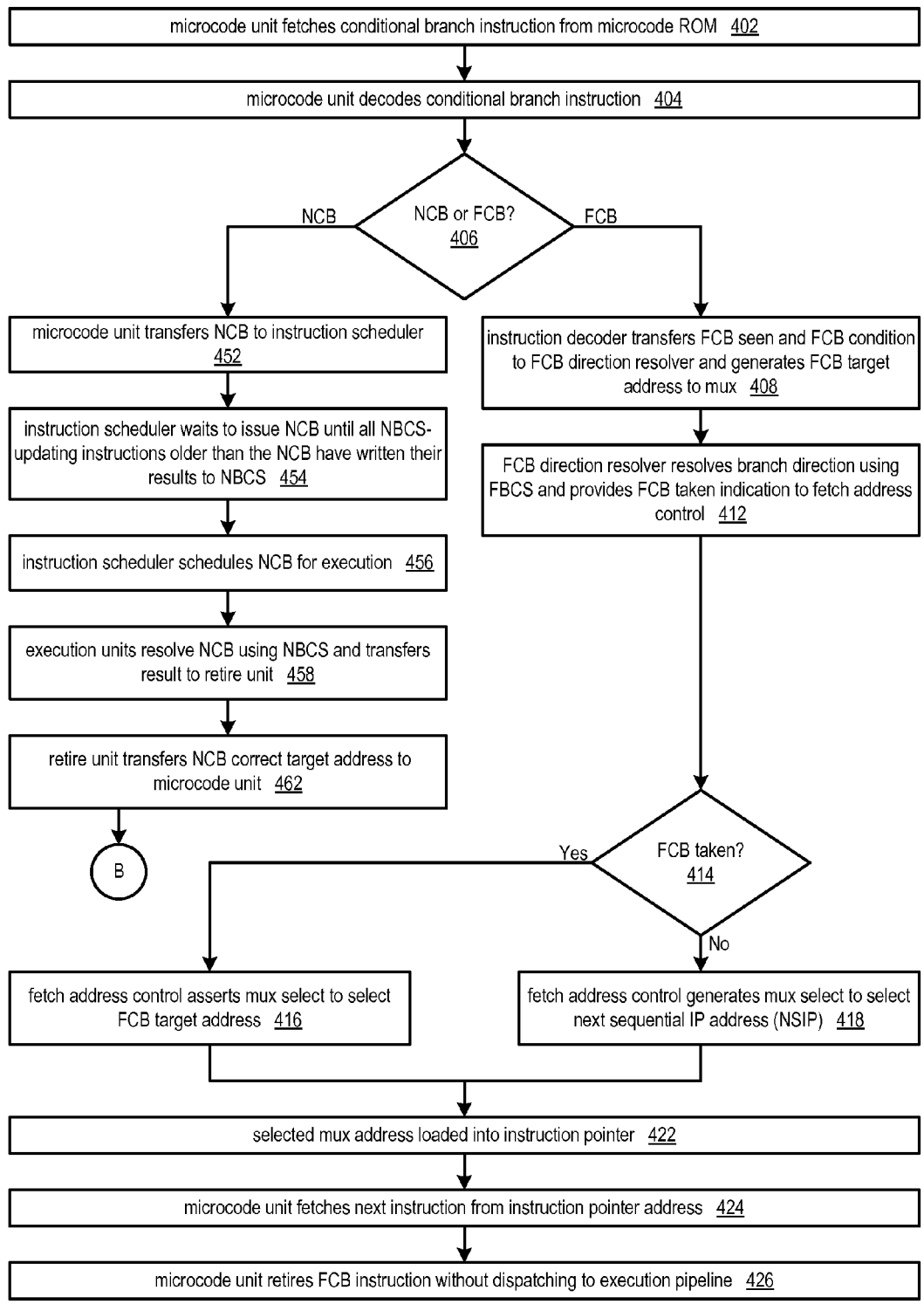
FIGS. 4a and 4b are a flowchart illustrating operation of the microprocessor of FIG. 3 of the present invention.
Figure 4B:
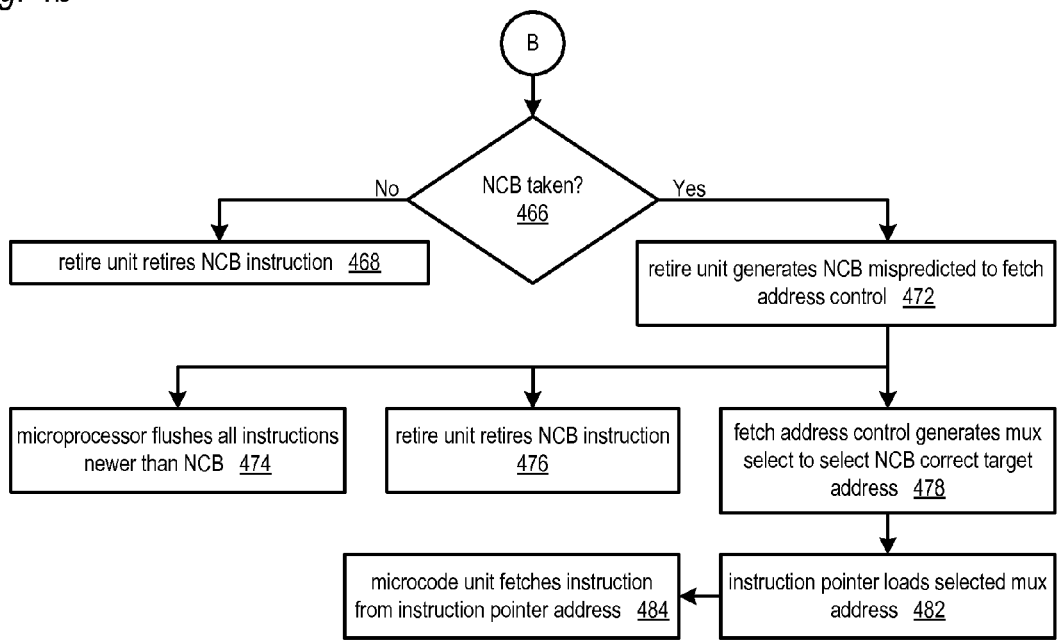

Referring now to FIG. 4, a flowchart illustrating operation of the microprocessor 100 of FIG. 3 of the present invention is shown. Many of the steps performed in the flowchart of FIG. 4 are similar to the steps performed in the flowchart of FIG. 2. However, steps which are performed by elements of the fetch unit 104 in FIG. 2 are performed by corresponding elements of the microcode unit 128 in FIG. 4. Furthermore, as mentioned above, the microcode unit 128 does not perform branch prediction; thus, FIG. 4 does not include steps associated with branch prediction. Flow begins at block 402.

At block 402, the microcode unit 128 fetches a conditional branch instruction from the microcode ROM 306. The conditional branch is either a normal conditional branch (NCB) instruction, or a fast conditional branch (FCB) instruction. Execution units 138 execute NCB instructions and the retire unit 144 retires NCB instructions. The microcode unit 128 of microprocessor 100 executes and retires FCB instructions fetched from the microcode ROM 306 by the microcode unit 128. Flow proceeds to block 404.

At block 404, the instruction decoder 108 in the microcode unit 128 decodes the conditional branch instruction. Flow proceeds to decision block 406.

At decision block 406, the instruction decoder 108 determines whether the conditional branch instruction fetched from the microcode ROM 306 is an NCB or FCB instruction. If the fetched conditional branch instruction is an NCB instruction, then flow proceeds to block 452. If the fetched conditional branch is a FCB instruction, then flow proceeds to block 408.

At block 408, the instruction decoder 108 transfers the FCB seen 164 and the FCB condition 166 signal to the FCB direction resolver 122 and generates the FCB target address 162 to the mux 114 of FIG. 3. The FCB condition 166 signal indicates to the FCB direction resolver 122 the branch condition that was specified in the FCB instruction. The FCB target address 162 is the branch target address specified in the FCB instruction and is the fetch address 168 that instructions in the microcode ROM 306 are fetched from if the FCB condition 166 is satisfied. Flow proceeds to block 412.

At block 412, the FCB direction resolver 122 resolves the FCB direction 172 using the fast branch conditional state (FBCS) 124 of FIG. 3 and provides the FCB direction 172 to the fetch address control 126 in the microcode unit 128. The FCB direction 172 is resolved as taken if the FBCS 124 satisfies the FCB condition 166; otherwise, the FCB direction 172 is resolved as not taken. Flow proceeds to decision block 414.

At decision block 414, the FCB direction resolver 122 determines whether the FCB branch condition 166 has been satisfied. If the FCB branch condition 166 has been satisfied, then flow proceeds to block 416. If the FCB branch condition 166 has not been satisfied, then flow proceeds to block 418.

At block 416, the fetch address control 126 asserts the mux select 152 to the mux 114 to select the FCB target address 162. This reflects the case where the FCB direction 172 was resolved as taken, and the microcode unit 128 fetches the next instruction from a fetch address 168 that is the FCB target address 162 specified in the FCB instruction. Flow proceeds to block 422.

At block 418, the fetch address control 126 asserts the mux select 152 to the mux 114 to select the next sequential IP address (NSIP) 154. This reflects the case where the FCB direction 172 was resolved as not taken, and the microcode unit 128 fetches the next instruction from a fetch address 168 that is the next sequential address 154 following the FCB instruction. Flow proceeds to block 422.

At block 422, the mux address selected in either block 416 or 418 is loaded into the instruction pointer 112. Flow proceeds to block 424.

At block 424, the microcode unit 128 fetches the next instruction from the fetch address 168 provided by the instruction pointer register 112. If the FCB instruction was taken, the fetch address 168 is the FCB target address 162 specified in the FCB instruction. If the FCB branch was not taken, the fetch address 168 is the next sequential address following the FCB instruction address in the microcode ROM 306. Flow proceeds to block 426.

At block 426, the microcode unit 128 retires the FCB instruction, without dispatching the FCB to the execution pipeline. It is noted that the retire unit 144 retires normal instructions, and the microcode unit 128 retires FCB instructions that were fetched from the microcode ROM 306. Flow ends at block 426.

At block 452, the microcode unit 128 transfers the NCB instruction 148 to the instruction scheduler 136. The instruction decoder 108 in the microcode unit 128 outputs the NCB instruction 148 to the mux 132, which selects microcode unit 128 instructions 148 to the RAT 134. Previously, the RAT 134 determines operand dependencies for the NCB instruction 148, and dispatches the NCB instruction 148 to the instruction scheduler 136. Flow proceeds to block 454.

At block 454, the instruction scheduler 136 waits to issue the NCB instruction 148 to the execution units 138 until all instructions that update the NBCS 142 and are older than the NCB instruction 148 have written their result to the NBCS 142. This ensures that the NBCS 142 is stable and correct prior to resolving the NCB instruction 148 branch direction in the execution units 138. Flow proceeds to block 456.

At block 456, the instruction scheduler 136 schedules execution units 138 to execute the NCB instruction 148. Flow proceeds to block 458.

At block 458, the execution units 138 resolve the NCB instruction 148, using the NBCS 142, and transfers the result to the retire unit 144. If the NBCS 142 satisfies the branch condition specified in the NCB instruction 148, the branch is resolved as taken; otherwise, the branch is resolved as not taken. Additionally, the execution units 138 calculate the NCB correct target address 176. Flow proceeds to block 462.

At block 462, the retire unit 144 transfers the NCB correct target address 176 that was determined in block 458 to the microcode unit 128. If the NCB instruction 148 branch was taken, the NCB correct target address 176 is the branch target address specified by the NCB instruction 148. If the NCB instruction 148 branch was not taken, the NCB correct target address 176 is the next sequential memory address following the address of the NCB instruction 148. Flow proceeds to decision block 466.

At decision block 466, the retire unit 144 determines if the NCB correct direction is taken. If not, then the microcode unit 128 correctly "predicted" the branch direction, and flow proceeds to block 468; otherwise, flow proceeds to block 472.

At block 468, the retire unit 144 retires the NCB instruction 148. The retire unit 144 is not required to perform additional steps since the microcode unit 128 correctly predicted the branch direction and the correct instructions were fetched from the microcode ROM 306 at the NSIP 154. Flow ends at block 468.

At block 472, the retire unit generates a true value on the NCB mispredicted indication 178 of FIG. 3 to the fetch address control 126 in the microcode unit 128 in response to determining that the NCB correct direction is taken, i.e., that the microcode unit 128 "mispredicted" the NCB direction. Flow proceeds to blocks 474, 476, and 478.

At block 474, the microprocessor 100 flushes all instructions from the execution pipeline that are newer in program order than the NCB instruction 148. The execution pipeline is flushed since the instructions in the pipeline are invalid due to being fetched from an incorrect fetch address 168. Flow ends at block 474.

At block 476, the retire unit 144 retires the NCB instruction 148. Flow ends at block 476.

At block 478, the fetch address control 126 in the microcode unit 128 generates the mux select 152 to select the NCB correct target address 176. Flow proceeds to block 482.

At block 482, the instruction pointer 112 loads the address selected by mux 114 at block 478, i.e., the NCB correct target address 176. Flow proceeds to block 484.

At block 484, the microcode unit 128 fetches the next instruction from the microcode ROM 306 at the fetch address 168 stored in the instruction pointer 112, i.e., the NCB correct target address 176. Flow ends at block 484.

Figure 5:
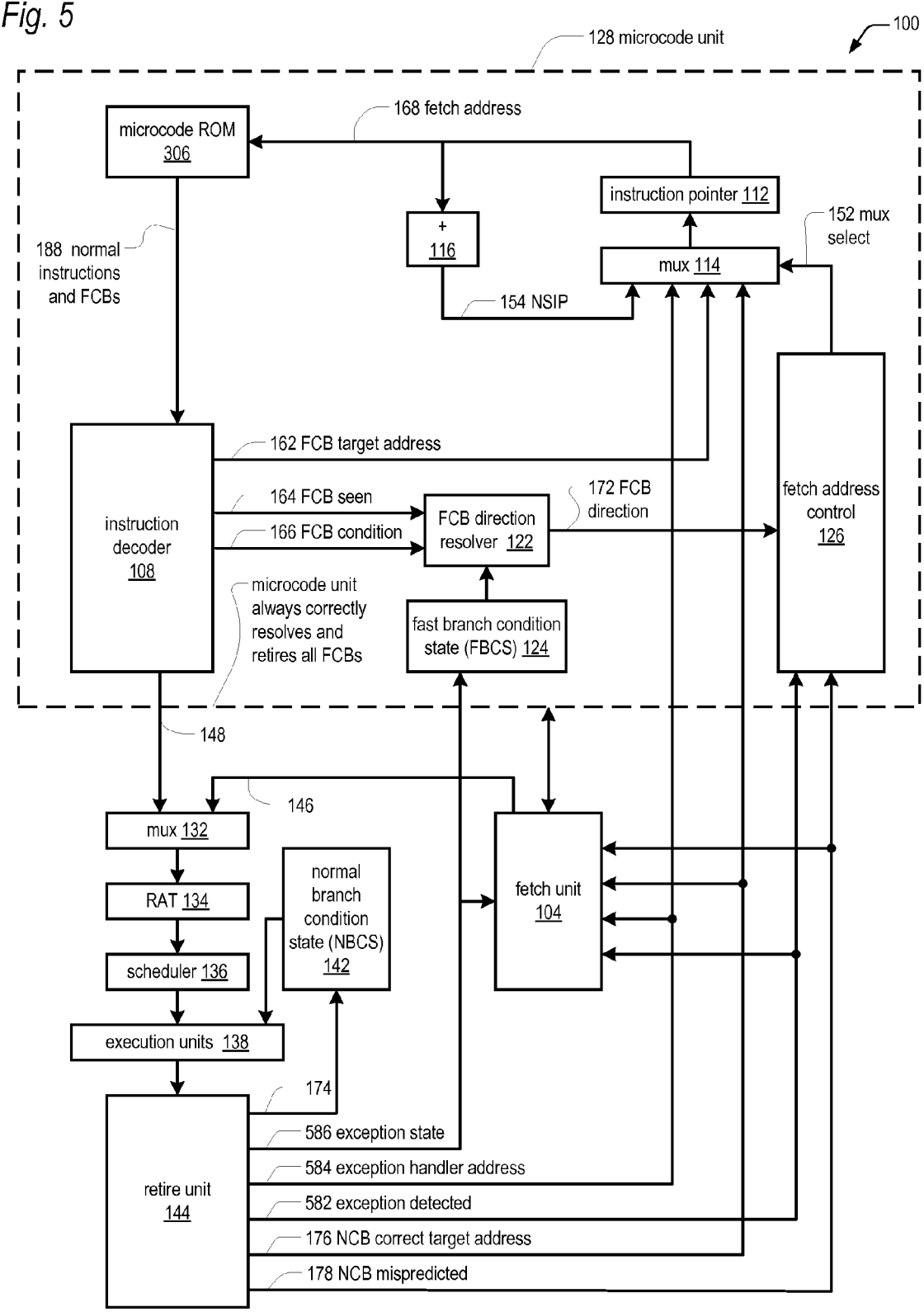
FIG. 5 is a block diagram illustrating a microprocessor according to an alternate embodiment of the present invention.

Referring now to FIG. 5, a block diagram illustrating a microprocessor 100 according to an alternate embodiment of the present invention is shown. FIG. 5 is similar to FIG. 3 in many respects. However, in the microprocessor 100 of FIG. 5, the retire unit 144 also generates an exception detected indicator 582, an exception handler address 584, and an exception state 586. The exception state 586 includes information that specifies the cause of the exception and the memory address of the instruction that caused the exception and/or the address of the next sequential instruction, among other things. The exception state 586 latched in response to exceptions may also include state bits of control registers of the microprocessor 100 that control various operating modes of thereof (such as the x86 CR registers); bits that control virtual machine extensions (such as x86 VMX bits), branch condition flags (such as the x86 EFLAGS register), code segment descriptors (such as the x86 CS register segment descriptor), task state segment descriptors (such as the x86 TSS bits), bits that specify a default size for data and addresses (such as the x86 D bit), and bits that specify a current privilege level of the microprocessor 100. In one embodiment, the microprocessor 100 hardware guarantees that the latched exception state 586 will not change during execution of the exception handler, and in particular until the fetch unit 104/microcode unit 128 finishes resolving the FCB, unless the exception handler itself changes the exception state 586.

If the retire unit 144 is about to retire an instruction that has generated an exception condition, the retire unit 144 generates a true value on the exception detected indicator 582, provides the exception handler address 584 to the mux 114 of the microcode unit 128 of the exception handler that is configured to handle the particular type of exception generated, and provides exception state 584 that describes information about the exception for loading into the FBCS 124. The retire unit 144 also provides the exception detected indicator 582, exception handler address 584, and exception state 586 to the fetch unit 104.

Figure 6:
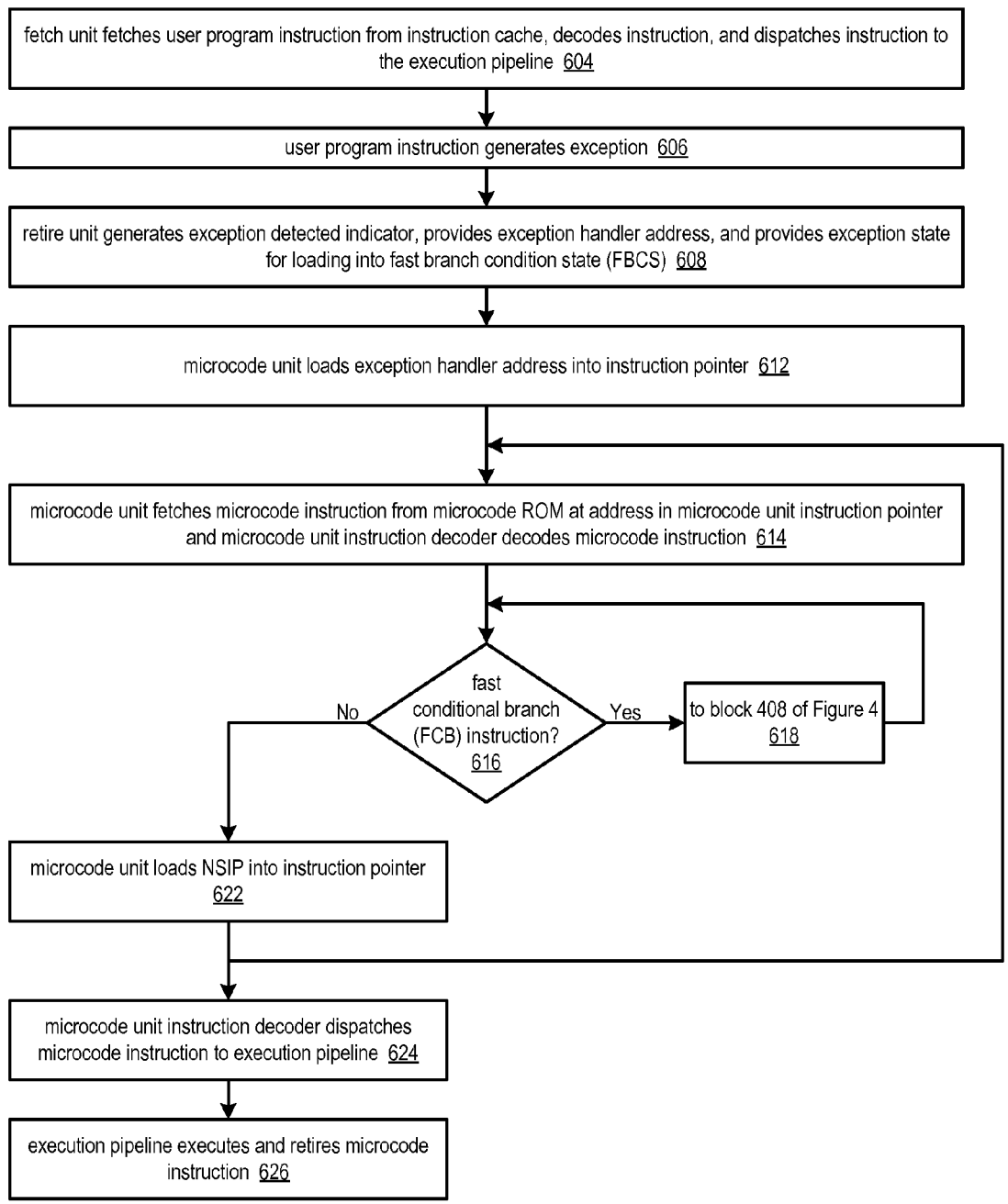
FIG. 6 is a flowchart illustrating operation of the microprocessor of FIG. 5 of the present invention.

Referring now to FIG. 6, a flowchart illustrating operation of the microprocessor 100 of FIG. 5 of the present invention is shown. Flow begins at block 604.

At block 604, the fetch unit 104 fetches a user program instruction 188 from the instruction cache 106, the fetch unit 104 instruction decoder 108 (as shown in FIG. 1) decodes the instruction 188, and dispatches the instruction 146 to the execution pipeline (i.e., to the mux 132, RAT 134, scheduler 136, execution units 138, and retire unit 144) for execution. Flow proceeds to block 606.

At block 606, the instruction 146 generates an exception. In one embodiment, information about the exception is stored to the ROB. Typically, the exception condition is detected in the execution units 138, which update the ROB with the exception information; however, the exception condition may be detected in other functional units of the microprocessor 100. Flow proceeds to block 608.

At block 608, the instruction has become the oldest instruction in the microprocessor 100 and is ready to retire. The retire unit 144, therefore, generates a true value on the exception detected indicator 582. Additionally, the retire unit 144 outputs the exception handler address 584 and the exception state 586, which is loaded into the FBCS 124 for use by a subsequent FCB of the exception handler routine, as described below. Flow proceeds to block 612.

At block 612, the microcode unit 128 loads the exception handler address 584 into the instruction pointer 112. Flow proceeds to block 614.

At block 614, the microcode unit 128 fetches a microcode routine instruction from the microcode ROM 306 at the fetch address 168 and the instruction decoder 108 decodes the instruction. In particular, the instruction decoder 108 generates a value on the FCB seen indicator 164 to indicate whether the instruction is an FCB. Flow proceeds to decision block 616.

At decision block 616, if the fetch address control 126 determines that the instruction is a FCB, flow proceeds to block 618; otherwise, flow proceeds to block 622.

At block 618, flow proceeds to block 408 of FIG. 4 to resolve and retire the FCB and to fetch the target instruction based on the resolution of the FCB (i.e., either at the FCB target address 162 or at the NSIP 154, depending on whether the FCB is taken or not taken, respectively). In particular, at block 412 of FIG. 4, the microcode unit 128 FCB direction resolver 122 will use the exception state 586 that was loaded into the FBCS 124 at block 608 in order to resolve the FCB direction 172 based on the FCB condition 166. Flow returns from block 408 of FIG. 4 to decision block 616 of FIG. 6 with respect to the fetched target instruction.

At block 622, the microcode unit 128 loads the NSIP 154 into the instruction pointer 112. Flow returns to block 614 to fetch the next instruction and flow proceeds to block 624.

At block 624, the microcode unit 128 dispatches the non-FCB instruction to the execution pipeline. Flow proceeds to block 626.

At block 626, the execution pipeline executes and retires the non-FCB instruction. Flow ends at block 626.

Although FIGS. 5 and 6 have been described with respect to an embodiment in which the exception handler resides within the microcode ROM 306 and the FCBs are resolved and retired by the microcode unit 128, other embodiments are contemplated in which the exception handler resides within the instruction cache 106 (e.g., is part of the operating system) and the FCBs are resolved and retired by the fetch unit 104.

Figure 7:
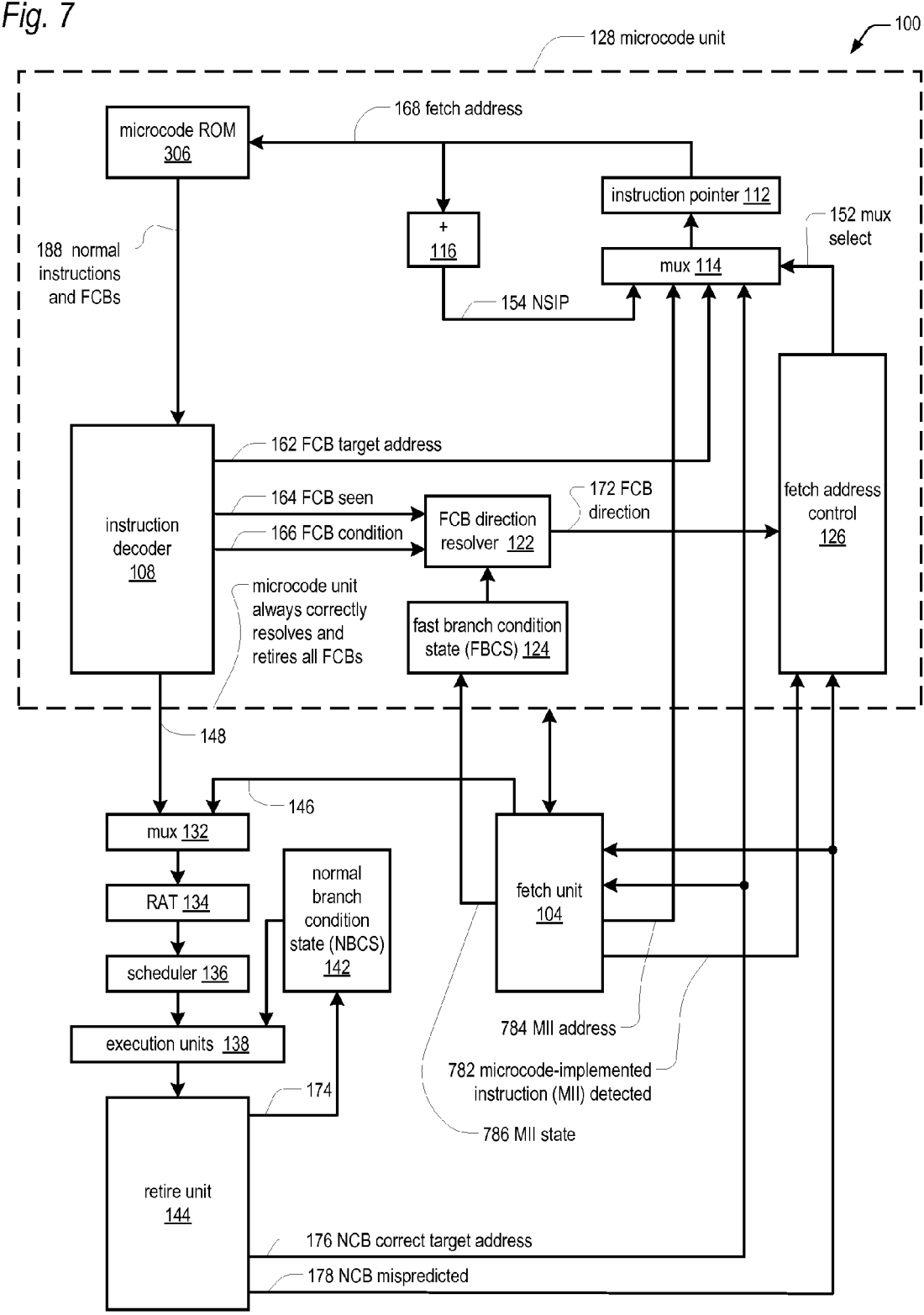
FIG. 7 is a block diagram illustrating a microprocessor according to an alternate embodiment of the present invention.

Referring now to FIG. 7, a block diagram illustrating a microprocessor 100 according to an alternate embodiment of the present invention is shown. FIG. 7 is similar to FIG. 5 in many respects. However, in the microprocessor 100 of FIG. 7, the fetch unit 104 generates an indicator 782 that a MII has been decoded, an address 784 within the microcode ROM 306 of the microcode routine that implements the MII, and a state 786 associated with the MII. The MII state 786 includes information that specifies the memory address of the MII and/or the address of the next sequential instruction, among other things. The MII state 786 latched in response to encountering a MII may also include state bits of control registers of the microprocessor 100 that control various operating modes of thereof (such as the x86 CR registers); decoded information about an opcode of the instruction that is implemented by the microcode routine; information about the size of the operand of the instruction that is implemented by the microcode routine (such as the x86 OS bits); information about the size of addresses specified by the instruction that is implemented by the microcode routine (such as x86 AS bits); information that indicates whether the microprocessor performs locked atomic memory operations to implement the instruction that is implemented by the microcode routine (such as x86 locked atomic memory instructions); information about addressing fields specified by the instruction that is implemented by the microcode routine (such as x86 mod/rm fields); information about whether the instruction that is implemented by the microcode routine is a non-memory access instruction; information about the microprocessor restores register values modified by the instruction that is implemented by the microcode routine if the instruction causes an exception. In one embodiment, the microprocessor 100 hardware guarantees that the latched MII state 786 will not change during execution of the implementing microcode routine, and in particular until the microcode unit 128 finishes resolving the FCB, unless the implementing microcode routine itself changes the MII state 786.

If the fetch unit 104 instruction decoder 108 decodes a MII, the fetch unit 104 generates a true value on the MII detected indicator 782, provides the MII routine address 784 to the mux 114 of the microcode unit 128, and provides the MII state 786 for loading into the FBCS 124. As discussed above, the MII may include complex and infrequently executed instructions of the microprocessor 100 instruction set, such as trigonometric function instructions, read/write model specific registers instructions, and serializing instructions.

Figure 8:
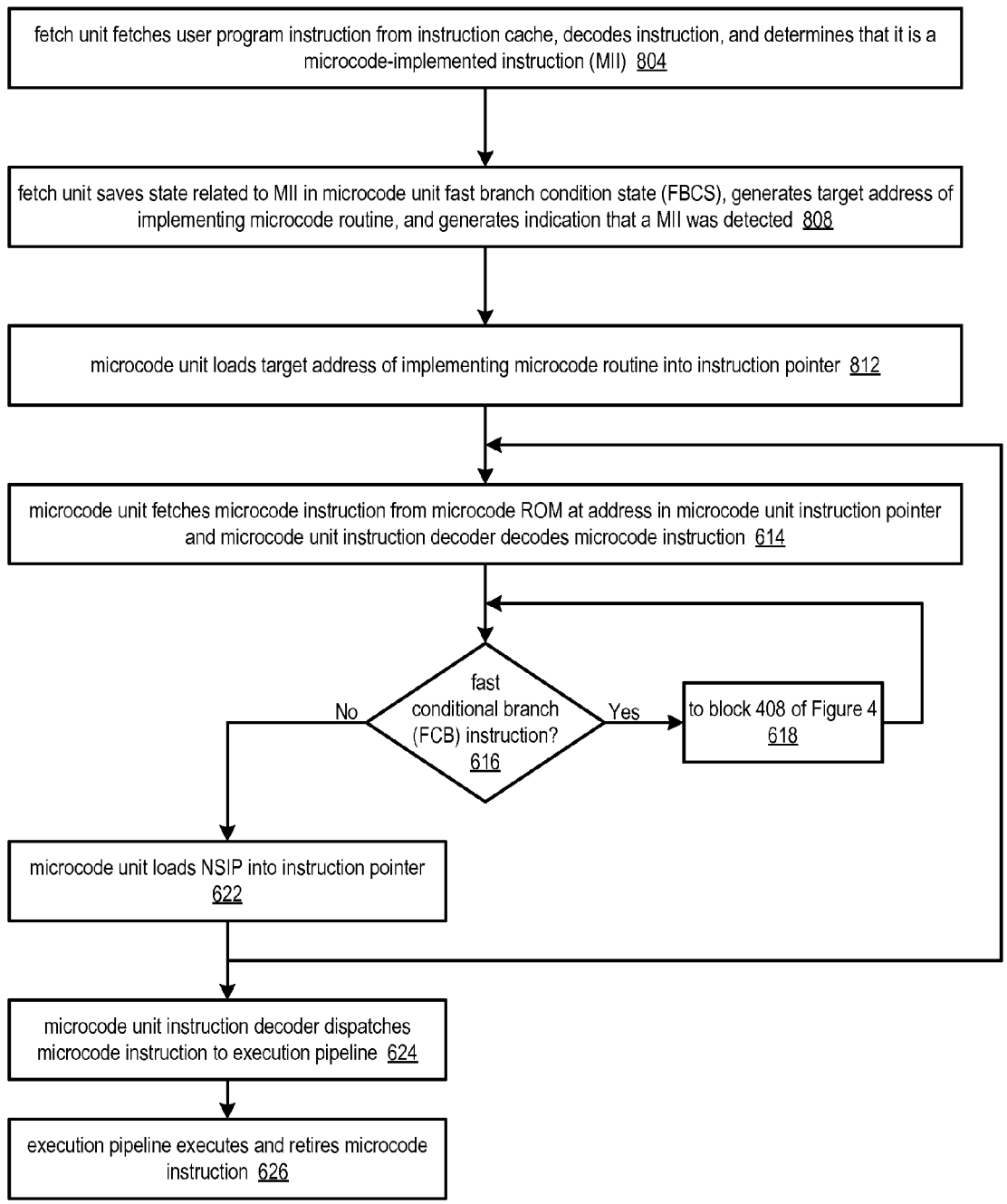
FIG. 8 is a flowchart illustrating operation of the microprocessor of FIG. 7 of the present invention.

Referring now to FIG. 8, a flowchart illustrating operation of the microprocessor 100 of FIG. 7 of the present invention is shown. Flow begins at block 804.

At block 804, the fetch unit 104 fetches a user program instruction 188 from the instruction cache 106, the fetch unit 104 instruction decoder 108 (as shown in FIG. 1) decodes the instruction 188, and determines that the instruction is a MII. Flow proceeds to block 808.

At block 808, fetch unit 104 generates a true value on the MII detected indicator 782. Additionally, the fetch unit 104 outputs the MII address 784 and the MII state 786, which is loaded into the FBCS 124 for use by a subsequent FCB of the microcode routine that implements the MII, as described below. Flow proceeds to block 812.

At block 812, the microcode unit 128 loads the MII address 784 into the instruction pointer 112. Flow proceeds to block 614.

Blocks 614 through 626 of FIG. 8 are similar to like-numbered blocks of FIG. 6; for the sake of brevity, their operation is not repeated here. However, it is noted that at block 618, when flow proceeds to block 408 of FIG. 4 to resolve and retire the FCB and to fetch the target instruction based on the resolution of the FCB (i.e., either at the FCB target address 162 or at the NSIP 154, depending on whether the FCB is taken or not taken, respectively), at block 412 of FIG. 4, the microcode unit 128 FCB direction resolver 122 will use the MII state 786 that was loaded into the FBCS 124 at block 808 in order to resolve the FCB direction 172 based on the FCB condition 166.

Figure 9:
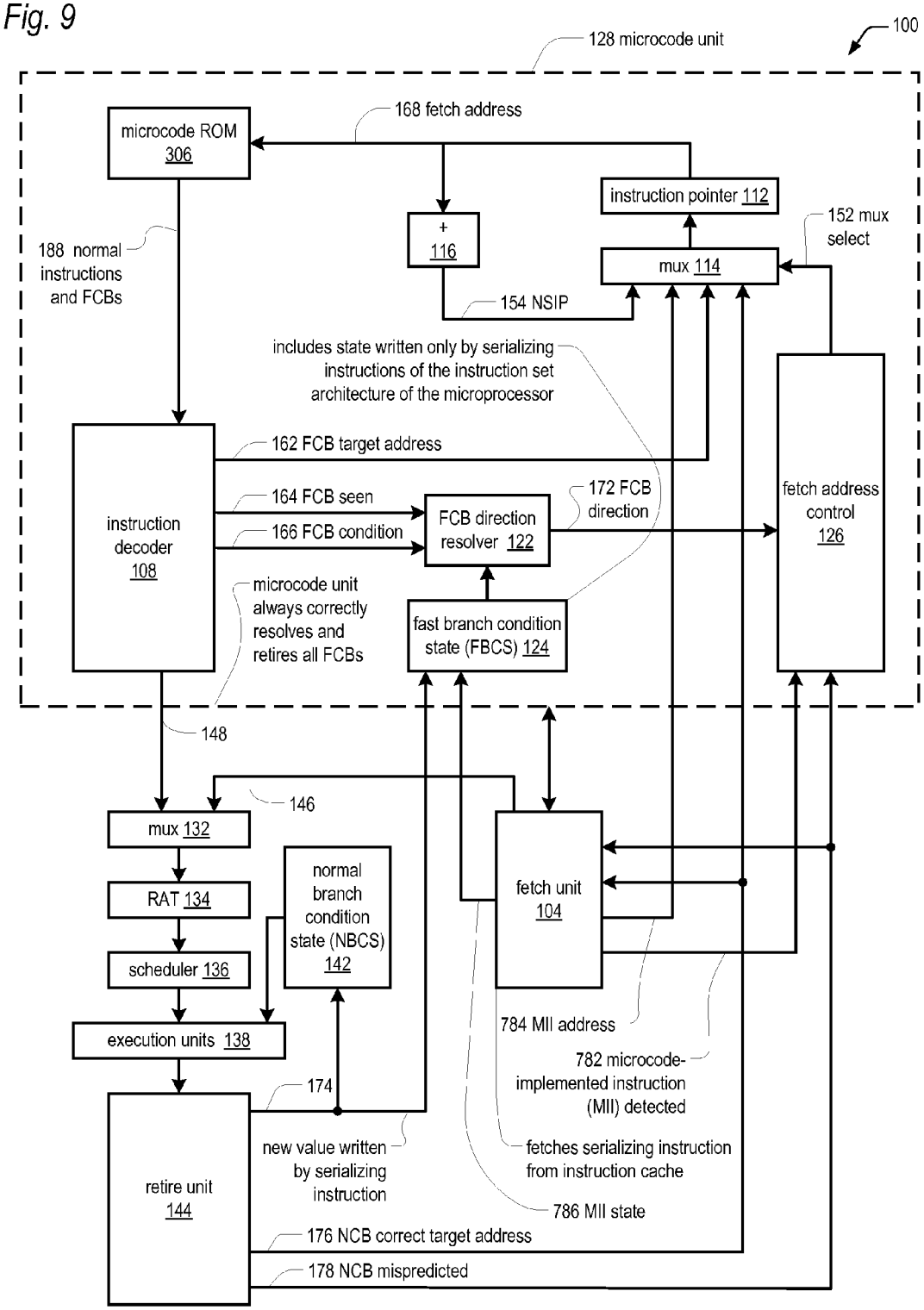
FIG. 9 is a block diagram illustrating a microprocessor according to an alternate embodiment of the present invention.

Referring now to FIG. 9, a block diagram illustrating a microprocessor 100 according to an alternate embodiment of the present invention is shown. FIG. 9 is similar to FIG. 7 in many respects. However, the retire unit 144 also writes the new value specified by the serializing instruction to the FBCS 124. Furthermore, more specifically, the indicator 782 indicates that a serializing instruction has been decoded, and the microcode ROM 306 address 784 is of the microcode routine that implements the serializing instruction, and the state 786 is associated with the serializing instruction. The serializing instruction state 786 includes information that specifies the memory address of the next sequential instruction after the serializing instruction, among other things such as those discussed above with respect to FIG. 7.

In one embodiment, all serializing instructions that update architectural state of the microprocessor 100 are microcode-implemented instructions (MII); thus, the only instructions that write to the serializing instruction-updated architectural state are instructions of the microcode routines of the microcode ROM 306. As discussed more below, the serializing instruction-implementing microcode routines are written in such a way to insure that the portion of the FBCS 124 written by the serializing instructions is static with respect to FCB instructions.

In one embodiment, the serializing instructions of the instruction set architecture comprise instructions that are identified by the x86 architecture as serializing instructions, such as those identified in section 7.4 of the IA-32 Intel® Architecture Software Developer's Manual, Volume 3A: System Programming Guide, Part 1, June 2006, which is incorporated by reference herein in its entirety for all purposes, which defines the serializing instructions as instructions that force the processor to complete all modifications to flags, registers, and memory by previous instructions and to drain all buffered writes to memory before the next instruction is fetched and executed. Examples of serializing instructions are an instruction that: invalidates a cache memory of the microprocessor 100, such as instruction cache 106 and/or a data cache (not shown); invalidates an entry of a translation lookaside buffer (not shown) of the microprocessor 100; resumes the microprocessor 100 from system management mode (SMM). In one embodiment, the RAT 134 and scheduler 136 do not perform dependency checking for the FBCS 124 written by serializing instructions.

The state written by serializing instructions tends to be state that is relatively infrequently changed, such as control register bits (e.g., the x86 CRx registers). Furthermore, these bits tend to be written by system software rather than user programs. Examples of FBCS 124 that is static because it is state written only by serializing instructions of the instruction set architecture are: bits that control whether or not the microprocessor 100 operates in a mode that employs memory protection facilities of the microprocessor 100 (such as the x86 CR0[PE] bit); bits that control whether or not the microprocessor operates in a memory paging mode (such as the x86 CR0[PG] bit); bits that control whether or not the microprocessor automatically performs alignment checking of memory references (such as the x86 CR0[AM] bit); bits that control whether virtual mode extensions of the microprocessor are enabled (such as the x86 VMX bits); bits of model specific registers (such as x86 MSRs); bits of a descriptor table register (such as x86 GDTR, LDTR, and IDTR registers); bits of a task register (such as the x86 TR register); which are given as illustrative examples.

Figure 10:
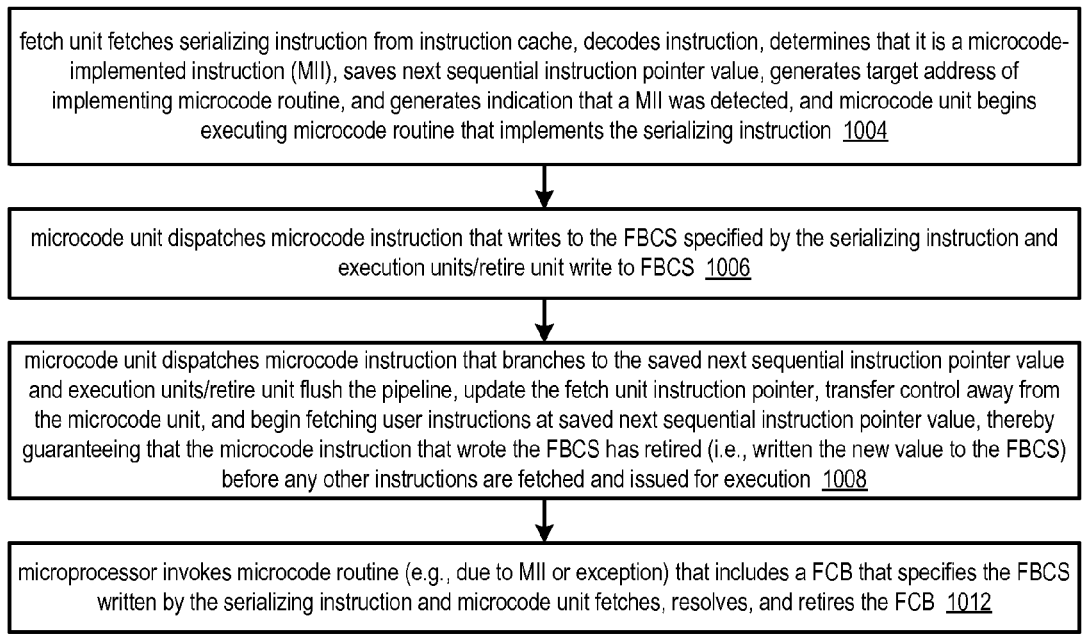
FIG. 10 is a flowchart illustrating operation of the microprocessor of FIG. 9 of the present invention.

Referring now to FIG. 10, a flowchart illustrating operation of the microprocessor 100 of FIG. 9 of the present invention is shown. Flow begins at block 1004.

At block 1004, similar to the manner described with respect to blocks 804-812 and 614 of FIG. 8, the fetch unit 104 fetches a serializing instruction from the instruction cache 106, decodes it, and determines that it is a MII. The fetch unit 104 responsively saves the next sequential instruction pointer value (in the RAT 134, according to one embodiment), generates the target address within the microcode ROM 306 of the microcode routine that implements the serializing instruction, and transfers control to the microcode unit 128. The microcode unit 128 begins executing the instructions of the serializing instruction-implementing microcode routine, which does not include any FCB instructions that specify the portion of the FBCS 124 that is written by the serializing instruction; however, the routine does include an instruction that writes the new value specified by the serializing instruction to the architectural state specified by the serializing instruction, which is included in the FBCS 124 of FIG. 9. Flow proceeds to block 1006.

At block 1006, the microcode unit 128 fetches and dispatches to the execution pipeline the instruction that writes the new value specified by the serializing instruction to the FBCS 124 specified by the serializing instruction. The execution units 138 and retire unit 144 responsively write the new value to the FBCS 124. Flow proceeds to block 1008.

At block 1008, the microcode unit 128 dispatches, typically as the last instruction of the serializing instruction-implementing microcode routine, an instruction that branches to the next sequential instruction pointer (NSIP) value that was saved at block 1004. In response to the branch to NSIP, the retire unit 144 flushes the microprocessor 100 pipeline, updates the fetch unit 104 instruction pointer 112 to the NSIP value (via the correct target address 176), and transfers control from the microcode unit 128 back to the main fetch unit 104, which begins fetching user program instructions again at the NSIP. This flushing guarantees that the microcode instruction that wrote the FBCS 124 at block 1006 has retired, i.e., has written the new value to the FBCS 124, before any other instructions are fetched and issued for execution by the microprocessor 100. Flow proceeds to block 1012.

At block 1012, at some time after the serializing instruction-implementing microcode routine has finished, the fetch unit 104 transfers control from the currently executing user program to the microcode unit 128 to execute another microcode routine. This may be due to either an exception condition or the decoding of a user program microcode-implemented instruction as described above with respect to FIG. 5-6 or 7-8, respectively. In particular, the microcode routine includes a FCB that specifies the FBCS 124 written at block 1006 as its branch condition state. The microcode unit 128 fetches, resolves, and retires the FCB, as described above with respect to blocks 408 through 426 of FIG. 4. Advantageously, the FBCS 124 specified by the FCB is static because there can be no unretired instruction within the microprocessor 100 pipeline older than the FCB that modifies the FBCS 124 (unless the microcode routine itself were to include one, which it does not) because of the flush performed at block 1008 in response to the branch to NSIP instruction. Stated alternatively, the FBCS 124 is static with respect to the FCB instruction in the microcode routine because any user program instruction that writes to the FBCS 124 is implemented in a microcode routine that includes the branch to NSIP in the implementing microcode routine, and no microcode routines write to the FBCS 124 except for the ones that implement the user program instruction that writes to it. Flow ends at block 1012.

Advantageously, as may be observed from the foregoing, the FBCS 124 written by a serializing instruction is static from the viewpoint of any FCB outside the serializing instruction-implementing microcode routines. By recognizing this static nature of the state written by serializing instructions, the present inventors have advantageously provided a FCB instruction that may specify the static state and thereby be resolved and retired faster than a conventional conditional branch instruction that would specify the state as its branch condition state.

Although the various embodiments of FIGS. 1-10 have been described individually, it should be noted that embodiments are contemplated that include all the features of the different individual embodiments or various combinations thereof. For example, embodiments are contemplated in which the microprocessor includes FCB instructions in user programs and/or microcode routines, including exception handlers and microcode routines for implementing macroinstructions, and that specify FBCS that includes exception state, MII state, state written by serializing instructions, state guaranteed by the microcode to be static, and various combinations thereof.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). Embodiments of the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A pipelined microprocessor, comprising:
   a control register, configured to store a control value that affects operation of the microprocessor;
   an instruction set architecture, that includes a conditional branch instruction that specifies a branch condition based on the control value stored in the control register, wherein the instruction set architecture further includes a serializing instruction that updates the control value in the control register, wherein the microprocessor is configured to complete all modifications to flags, registers, and memory by instructions previous to the serializing instruction and to drain all buffered writes to memory before it fetches and executes the next instruction after the serializing instruction;
   execution units, coupled to the control register, configured to update the control value in the control register in response to the serializing instruction; and
   a fetch unit, coupled to the control register, configured to fetch, decode, and unconditionally correctly resolve and retire the conditional branch instruction based on the control value stored in the control register rather than dispatching the conditional branch instruction to the execution units to be resolved.

2. The pipelined microprocessor of claim 1, further comprising:
   a general purpose register, coupled to the execution units, configured to store a second value;
   wherein the instruction set architecture further includes a second conditional branch instruction that specifies a second branch condition based on the second value stored in the general purpose register;
   wherein the fetch unit is further configured to fetch and decode the second conditional branch instruction based on the second value stored in the general purpose register and to dispatch the second conditional branch instruction to the execution units to be resolved.

3. The pipelined microprocessor of claim 1, wherein the conditional branch instruction instructs the microprocessor to unconditionally correctly resolve and retire the conditional branch instruction based on the control value stored in the control register without regard to whether the execution units have updated the control value in the control register in response to the serializing instruction.

4. The pipelined microprocessor of claim 1, wherein the microprocessor is further configured to implement the serializing instruction in a microcode routine executed by the microprocessor, wherein the microcode routine includes a flushing instruction that follows an updating instruction in the microcode routine program order, wherein the updating instruction updates the control value in the control register with the value specified by the serializing instruction, wherein the flushing instruction flushes the microprocessor pipeline of all instructions after the flushing instruction in the microcode routine program order.

5. The pipelined microprocessor of claim 1, wherein the conditional branch instruction is included within a user program stored in a system memory coupled to the microprocessor.

6. The pipelined microprocessor of claim 1, wherein the conditional branch instruction is included within a microcode routine stored in a microcode memory of the microprocessor.

7. The pipelined microprocessor of claim 1, wherein the control register value controls whether or not the microprocessor operates in a mode that employs memory protection facilities of the microprocessor.

8. The pipelined microprocessor of claim 1, wherein the control register value controls whether or not the microprocessor operates in a memory paging mode.

9. The pipelined microprocessor of claim 1, wherein the control register value controls whether or not the microprocessor automatically performs alignment checking of memory references.

10. The pipelined microprocessor of claim 1, wherein the control register value controls whether virtual mode extensions of the microprocessor are enabled.

11. The pipelined microprocessor of claim 1, wherein the control register comprises a model specific register (MSR).

12. The pipelined microprocessor of claim 1, wherein the control register comprises a descriptor table register of the microprocessor.

13. The pipelined microprocessor of claim 1, wherein the control register comprises a task register of the microprocessor.

14. The pipelined microprocessor of claim 1, wherein the serializing instruction invalidates a cache memory of the microprocessor.

15. The pipelined microprocessor of claim 1, wherein the serializing instruction invalidates an entry of a translation lookaside buffer of the microprocessor.

16. The pipelined microprocessor of claim 1, wherein the serializing instruction resumes the microprocessor from system management mode (SMM).

17. A method for fast execution of a conditional branch instruction in a pipelined microprocessor having a control register that stores a control value that affects operation of the microprocessor, the microprocessor also having instruction set architecture that includes a serializing instruction that updates the control value in the control register, wherein the microprocessor is configured to complete all modifications to flags, registers, and memory by instructions previous to the serializing instruction and to drain all buffered writes to memory before it fetches and executes the next instruction after the serializing instruction, the method comprising:
  including in the instruction set architecture a conditional branch instruction that specifies a branch condition based on the control value stored in the control register;
  updating the control value in the control register in response to the serializing instruction, wherein said updating the control value in the control register is performed by execution units of the microprocessor; and
  fetching, decoding, and unconditionally correctly resolving and retiring the conditional branch instruction based on the control value stored in the control register rather than dispatching the conditional branch instruction to the execution units to be resolved, wherein said fetching, decoding, and unconditionally correctly resolving and retiring are performed by a fetch unit of the microprocessor.

18. The method of claim 17, further comprising:
  having in the instruction set architecture a second conditional branch instruction that specifies a second branch condition based on a second value stored in a general purpose register of the microprocessor;
  fetching and decoding the second conditional branch instruction based on the second value stored in the general purpose register; and
  dispatching the second conditional branch instruction to the execution units to be resolved, wherein said fetching and decoding and dispatching the second conditional branch instruction are performed by the fetch unit.

19. The method of claim 17, wherein the conditional branch instruction instructs the microprocessor to unconditionally correctly resolve and retire the conditional branch instruction based on the control value stored in the control register without regard to whether the execution units have updated the control value in the control register in response to the serializing instruction.

20. The method of claim 17, wherein the microprocessor is further configured to implement the serializing instruction in a microcode routine executed by the microprocessor, wherein the microcode routine includes a flushing instruction that follows an updating instruction in the microcode routine program order, wherein the updating instruction updates the control value in the control register with the value specified by the serializing instruction, wherein the flushing instruction flushes the microprocessor pipeline of all instructions after the flushing instruction in the microcode routine program order.

21. The method of claim 17, wherein the conditional branch instruction is included within a user program stored in a system memory coupled to the microprocessor.

22. The method of claim 17, wherein the conditional branch instruction is included within a microcode routine stored in a microcode memory of the microprocessor.

23. The method of claim 17, wherein the control register value controls whether or not the microprocessor operates in a mode that employs memory protection facilities of the microprocessor.

24. The method of claim 17, wherein the control register value controls whether or not the microprocessor operates in a memory paging mode.

25. The method of claim 17, wherein the control register value controls whether or not the microprocessor automatically performs alignment checking of memory references.

26. The method of claim 17, wherein the control register value controls whether virtual mode extensions of the microprocessor are enabled.

27. The method of claim 17, wherein the control register comprises a model specific register (MSR).

28. The method of claim 17, wherein the control register comprises a descriptor table register of the microprocessor.

29. The method of claim 17, wherein the control register comprises a task register of the microprocessor.

30. The method of claim 17, wherein the serializing instruction invalidates a cache memory of the microprocessor.

31. The method of claim 17, wherein the serializing instruction invalidates an entry of a translation lookaside buffer of the microprocessor.

32. The method of claim 17, wherein the serializing instruction resumes the microprocessor from system management mode (SMM).

33. A computer program product for use with a computing device, the computer program product comprising:
  a computer usable storage medium, having computer readable program code embodied in said medium, for specifying a pipelined microprocessor, the computer readable program code comprising:
    first program code for specifying a control register, configured to store a control value that affects operation of the microprocessor;
    second program code for specifying an instruction set architecture, that includes a conditional branch instruction that specifies a branch condition based on the control value stored in the control register, wherein the instruction set architecture further includes a serializing instruction that updates the control value in the control register, wherein the microprocessor is configured to complete all modifications to flags, registers, and memory by instructions previous to the serializing instruction and to drain all buffered writes to memory before it fetches and executes the next instruction after the serializing instruction;
    third program code for specifying execution units, coupled to the control register, configured to update the control value in the control register in response to the serializing instruction; and
    fourth program code for specifying a fetch unit, coupled to the control register, configured to fetch, decode, and unconditionally correctly resolve and retire the conditional branch instruction based on the control value stored in the control register rather than dispatching the conditional branch instruction to the execution units to be resolved.

* * * * *